(12) United States Patent
Kuwamura et al.

(10) Patent No.: US 9,726,027 B2
(45) Date of Patent: Aug. 8, 2017

(54) TURBINE

(75) Inventors: Yoshihiro Kuwamura, Tokyo (JP);
Kazuyuki Matsumoto, Tokyo (JP);
Hiroharu Oyama, Tokyo (JP);
Yoshinori Tanaka, Tokyo (JP);
Masaaki Matsuura, Tokyo (JP);
Asaharu Matsuo, Kobe (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 712 days.

(21) Appl. No.: 13/817,893

(22) PCT Filed: Sep. 8, 2011

(86) PCT No.: PCT/JP2011/070488
§ 371 (c)(1),
(2), (4) Date: Feb. 20, 2013

(87) PCT Pub. No.: WO2012/036068
PCT Pub. Date: Mar. 22, 2012

(65) Prior Publication Data
US 2013/0149124 A1 Jun. 13, 2013

(30) Foreign Application Priority Data

Sep. 17, 2010 (JP) .................................. 2010-209570

(51) Int. Cl.
*F01D 5/20* (2006.01)
*F01D 9/00* (2006.01)
(Continued)

(52) U.S. Cl.
CPC ............... *F01D 9/00* (2013.01); *F01D 5/225* (2013.01); *F01D 11/08* (2013.01); *F05D 2220/31* (2013.01)

(58) Field of Classification Search
CPC . F01D 5/143; F01D 5/225; F01D 9/00; F01D 11/08; F05D 2220/31
See application file for complete search history.

(56) References Cited

U.S. PATENT DOCUMENTS 5,997,249 A * 12/1999 Bell .................... F01D 5/143
415/173.5
2010/0196139 A1* 8/2010 Beeck .................. F04D 29/102
415/111

(Continued)

FOREIGN PATENT DOCUMENTS

CN 1251153 4/2000
CN 1392917 1/2003

(Continued)

OTHER PUBLICATIONS

Korean Notice of Allowance issued Nov. 4, 2014 in corresponding Korean application No. 10-2013-7003985 (with English translation).

(Continued)

*Primary Examiner* — Jason Shanske
*Assistant Examiner* — Matthew T Largi
(74) *Attorney, Agent, or Firm* — Wenderoth, Lind & Ponack, L.L.P.

(57) ABSTRACT

A turbine includes: a blade body having a blade provided at one of a rotor rotatably supported and a stator provided around the rotor and extending in a radial direction and a shroud extending in a circumferential direction at a tip portion in the radial direction of the blade; and an accommodating concave body provided at another one of the rotor and the stator, extending in the circumferential direction, accommodating the shroud with a gap interposed therebetween, and relatively rotating with respect to the blade body, wherein a leakage flow leaked from a main flow flowing along the blade flows into the gap; and wherein the shroud (Continued)

is provided with a guide curved surface formed between a peripheral surface facing the accommodating concave body and a trailing edge end portion formed closer to a main flow side in a downstream side of the leakage flow than the peripheral surface.

20 Claims, 19 Drawing Sheets

(51) Int. Cl.
  *F01D 11/08* (2006.01)
  *F01D 5/22* (2006.01)

(56) References Cited

U.S. PATENT DOCUMENTS

| 2013/0189107 | A1* | 7/2013 | Krishnan | F01D 11/001 416/193 R |
|---|---|---|---|---|
| 2013/0230379 | A1* | 9/2013 | Ali | F01D 5/225 415/1 |
| 2014/0205444 | A1* | 7/2014 | Zheng | F01D 11/001 415/173.1 |

FOREIGN PATENT DOCUMENTS

| CN | 101315032 | | 12/2008 |
|---|---|---|---|
| EP | 1 895 101 | | 3/2008 |
| EP | 2 096 262 | | 9/2009 |
| JP | 10-008910 | | 1/1998 |
| JP | 2006-138259 | | 6/2006 |
| JP | 2006138259 A | * | 6/2006 |
| JP | 2006-291967 | | 10/2006 |
| JP | 2007-321721 | | 12/2007 |
| JP | 2007321721 A | * | 12/2007 |
| JP | 2011-247158 | | 12/2011 |

OTHER PUBLICATIONS

International Search Report mailed Nov. 8, 2011 in International (PCT) Application No. PCT/JP2011/070488 with English translation.

Written Opinion of the International Searching Authority mailed Nov. 8, 2011 in International (PCT) Application No. PCT/JP2011/070488 with English translation.

Chinese Office Action issued Jun. 5, 2014 in correpsonding Chinese Patent Application No. 201180040197.6 with English translation.

* cited by examiner

TURBINE

TECHNICAL FIELD

The present invention relates to a turbine that is used in, for example, a power-generating plant, a chemical plant, a gas plant, an iron mill, a ship, or the like.

Priority is claimed on Japanese Patent Application No. 2010-209570 filed on Sep. 17, 2010, the contents of which are incorporated herein by reference.

BACKGROUND ART

As is well known, as a type of steam turbine, there is a steam turbine provided with a casing, a shaft body rotatably provided inside of the casing, a plurality of turbine vanes fixedly disposed at an inner peripheral portion of the casing, and a plurality of turbine blades radially provided at the shaft body at the downstream sides of the plurality of turbine vanes. In the case of an impulse turbine among such steam turbines, the pressure energy of steam is converted into velocity energy by the turbine vane and the velocity energy is converted into rotational energy (mechanical energy) by the turbine blade. Further, in the case of a reaction turbine, pressure energy is also converted into velocity energy by the turbine blade and the velocity energy is converted into rotational energy (mechanical energy) by a reaction force generated by the ejected steam.

In this type of steam turbine, a gap is formed between a tip portion of the turbine blade and a casing that surrounds the turbine blade, thereby forming a flow path of steam, and a gap is also formed between a tip portion of the turbine vane and the shaft body. Leakage flow (leak steam) flows toward the downstream side from the upstream side of main flow in these gaps. However, if the leakage flow joins the main flow at the downstream side of the main flow, the flow of the main flow is disturbed, whereby loss (hereinafter referred to as "mixing loss") is generated, and thus turbine efficiency is reduced.

In PTL 1 below, there is proposed a configuration in which a guide plate guiding leakage flow is mounted on a shroud at the outlet side of a flow path of the leakage flow among the above-described gaps, thereby making the direction of the leakage flow conform to the direction of main flow flowing out from the turbine blade. By such a configuration, a disturbance of the main flow that is generated at the time of joining of the leakage flow and the main flow is suppressed, and thus the mixing loss is reduced.

CITATION LIST

Patent Literature

[PTL 1] Japanese Unexamined Patent Application, First Publication No. 2007-321721

Technical Problem

However, in the related art, there is a problem in that a vortex of the leakage flow which agitates the main flow is formed at the downstream side of the above-described gap, and thus the mixing loss is generated.

SUMMARY OF INVENTION

The present invention has been made in consideration of such circumstances and has an object of further reducing the mixing loss, thereby improving turbine efficiency.

Solution to Problem

According to an aspect of the present invention, a turbine includes a rotor that is rotatably supported; a stator provided around the rotor; a blade body having a blade provided at one of the rotor and the stator and extending in a radial direction toward the other side from one side and a shroud extending in a circumferential direction at a tip portion in the radial direction of the blade; and an accommodating concave body provided at the other of the rotor and the stator, extending in the circumferential direction, accommodating the shroud with a gap interposed therebetween, and relatively rotating with respect to the blade body; wherein a leakage flow leaked from a main flow flowing along the blade flows into the gap; and wherein the shroud is provided with a guide curved surface formed between a peripheral surface facing the accommodating concave body and a trailing edge end portion formed closer to the main flow side in a downstream side of the leakage flow than the peripheral surface, and a guide curved surface is configured to guide the leakage flow along the peripheral surface from the peripheral surface to the trailing edge end portion.

According to this configuration, since the guide curved surface formed between the peripheral surface and the trailing edge end portion guides the leakage flow flowing along the peripheral surface, so as to cause the leakage flow to follow the guide curved surface from the peripheral surface to the trailing edge end portion, the leakage flow flows out from the trailing edge end portion to the main flow, whereby a vortex (hereinafter referred to as a "forward vortex") that is directed from the upstream side of the main flow to the downstream side at the boundary between a gap between the blade body and the accommodating concave body and a flow path of the main flow is formed.

If the trailing edge end portion and the peripheral surface are continuous through a corner portion without having the guide curved surface, the leakage flow flowing along the peripheral surface is separated at the corner portion, and thus a reverse vortex flowing in the opposite direction to the forward vortex is formed. Since the reverse vortex flows back with respect to the main flow at the boundary between the gap and the flow path of the main flow and draws the main flow into the gap at a trailing edge of the shroud, the main flow is agitated.

On the other hand, since the forward vortex that is formed by the above-described configuration does not flow back with respect to the main flow at the boundary between the gap and the flow path of the main flow and does not draw the main flow into the gap at the trailing edge of the shroud, the main flow is not agitated.

Therefore, the generation of the mixing loss can be suppressed, and thus the turbine efficiency can be improved.

Further, the trailing edge end portion may be made of an axial fin extending in a direction of a rotation axis.

According to this configuration, since the trailing edge end portion is made of the axial fin extending in the direction of the rotation axis, the radial direction velocity component of the leakage flow guided to the trailing edge end portion is diminished. Thus, a difference between the radial direction velocity component of the main flow and the radial direction velocity component of the leakage flow becomes small. Therefore, since it is possible to make the leakage flow smoothly join the main flow, the mixing loss can be further reduced.

Further, a guide pathway that performs guidance in the opposite direction to a relative rotation direction of the shroud with respect to the accommodating concave body may be formed on the guide curved surface, and in the guide pathway, an inflow portion allowing the leakage flow to flow into the guide pathway at the peripheral surface side and an outflow portion allowing the leakage flow to flow out of the guide pathway at the trailing edge end portion side may be shifted in the opposite direction to the relative rotation direction.

According to this configuration, since the guide pathway that performs guidance in the opposite direction to the relative rotation direction of the shroud with respect to the accommodating concave body is formed, the circumferential direction velocity component in the opposite direction to the relative rotation direction is given to the circumferential direction velocity component of the leakage flow flowing in the relative rotation direction, whereby a difference between the circumferential direction velocity component of the leakage flow and the circumferential direction velocity component of the main flow can be reduced. Therefore, since it is possible to make the leakage flow smoothly join the main flow, the mixing loss can be further reduced.

Further, the guide pathway may be formed in a groove shape.

Further, the guide pathway may be formed by a protrusion wall protruding in the normal direction of the guide curved surface.

According to this configuration, the guide pathway can be formed relatively easily.

Further, in the guide curved surface, a cross-sectional contour of a cross-section of the guide curved surface along a plane intersecting the circumferential direction may be formed in an arc shape.

Further, in the guide curved surface, a cross-sectional contour of a cross-section of the guide curved surface along a plane intersecting the circumferential direction may be formed in an elliptical shape.

According to this configuration, the guide curved surface can be formed relatively easily.

Further, the guide curved surface may be formed in a more concavo-convex shape compared to the surface of the blade at least.

According to this configuration, since the guide curved surface is formed in a concavo-convex shape, the leakage flow flowing along the guide curved surface is turned into turbulent flow. Thus, adherability of the leakage flow to the guide curved surface can be improved and it becomes difficult for the leakage flow to be separated from the guide curved surface. Thus, the leakage flow can be more reliably guided to the trailing edge end portion of the shroud.

Effects of the Invention

According to the present invention, the mixing loss can be further reduced, and thus the turbine efficiency can be improved.

DESCRIPTION OF EMBODIMENTS

Figure 1:
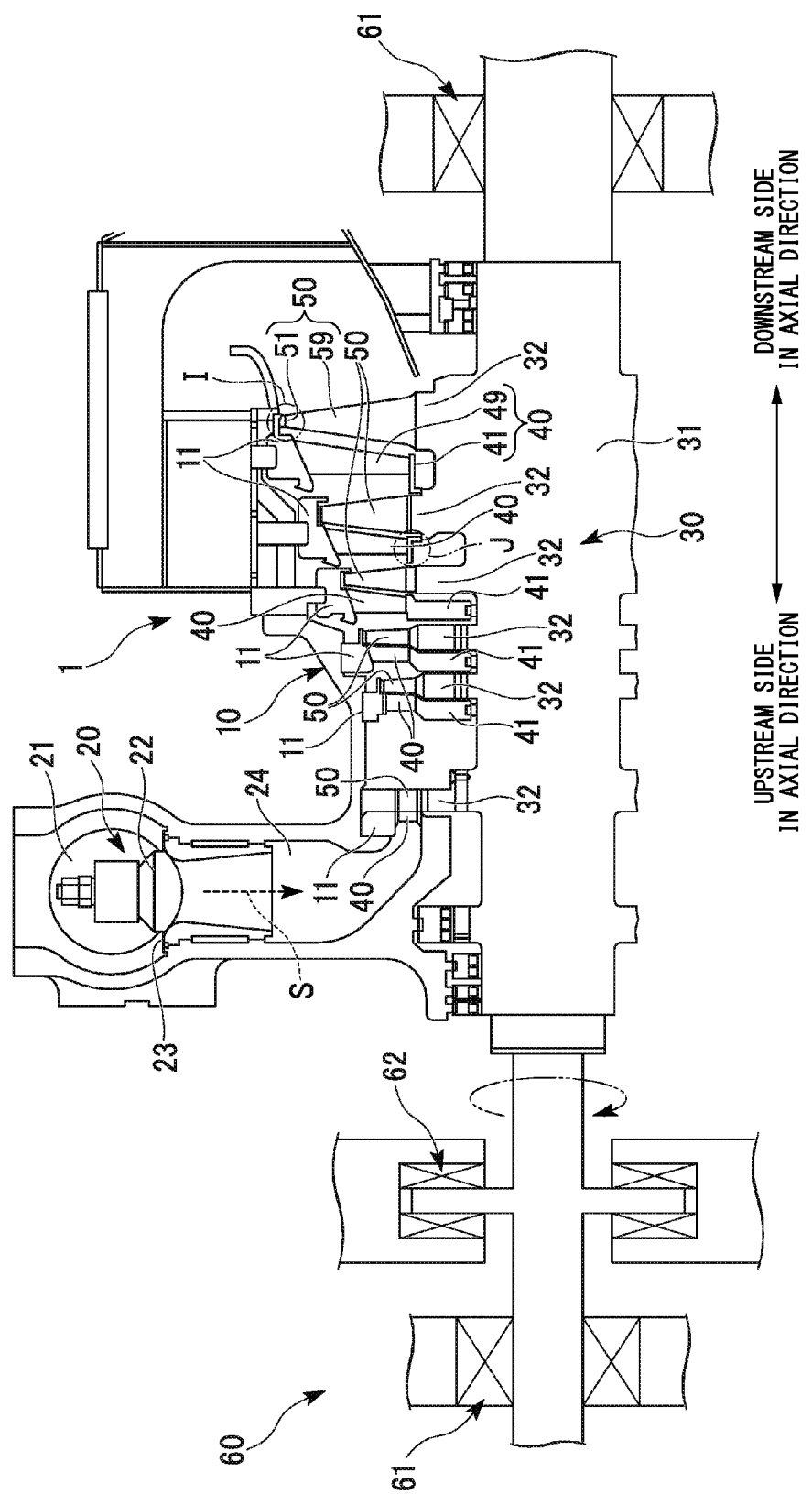
FIG. 1 is a cross-sectional view showing the schematic configuration of a steam turbine 1 according to a first embodiment of the present invention.

Hereinafter, embodiments of the invention will be described in detail referring to the drawings.

(First Embodiment)

FIG. 1 is a cross-sectional view showing the schematic configuration of a steam turbine (a turbine) 1 according to a first embodiment of the present invention.

The steam turbine 1 mainly includes a casing (a stator) 10, an adjusting valve 20 that adjusts the amount and the pressure of steam S flowing into the casing 10, a shaft body (a rotor) 30 that is rotatably provided inward in the casing 10 and transmits power to a machine (not shown) such as an electric generator, a turbine vane 40 held in the casing 10, a turbine blade (a blade body) 50 provided at the shaft body 30, and a bearing unit 60 that supports the shaft body 30 so as to be able to rotate the shaft body 30 around an axis.

The casing 10 has a hermetically sealed internal space and becomes a flow path of the steam S. The casing 10 has a ring-shaped divider outer ring (an accommodating concave body) 11 solidly fixed to the inner wall surface of the casing and surrounds the shaft body 30.

The adjusting valve 20 is mounted in plural pieces in the inside of the casing 10 and each adjusting valve 20 includes an adjusting valve chamber 21 into which the steam S flows from a boiler (not shown), a valve body 22, and a valve seat 23, and if the valve body 22 is separated from the valve seat 23, a steam flow path is opened, and thus the steam S flows into the internal space of the casing 10 through a steam chamber 24.

The shaft body 30 includes a shaft main body 31 and a plurality of disks 32 radially extending from the outer periphery of the shaft main body 31. The shaft body 30 is made so as to transmit rotational energy to a machine (not shown) such as an electric generator.

The shaft body 30 passes through the divider outer ring 11 in the inside of the casing 10.

The turbine vane 40 has a blade 49 radially extending toward the shaft body 30 from the divider outer ring 11, and a hub shroud 41 circumferentially extending at a tip portion in the radial direction of the blade 49.

The turbine vane 40 is radially disposed in a large number so as to surround the shaft body 30, thereby configuring an annular turbine vane group, and each turbine vane 40 is held on the divider outer ring 11 described above. In each turbine vane 40, the hub shroud 41 is connected to be continuous in the circumferential direction and the hub shroud 41 connected in a ring shape on the whole faces the shaft body 30.

The annular turbine vane group configured to be the plurality of turbine vanes 40 is formed by six at intervals in the direction of a rotation axis and made so as to guide the steam S to the turbine blade 50 side adjacent to the downstream side.

The turbine blade 50 has a blade 59 radially extending toward the divider outer ring 11 from the shaft body 30, and a tip shroud (a shroud) 51 circumferentially extending at a tip portion in the radial direction of the blade 59.

The turbine blade 50 is radially disposed in a large number on the downstream side of each annular turbine vane group, thereby configuring an annular turbine blade group, and each turbine blade 50 is solidly mounted on an outer peripheral portion of the disk 32 of the shaft body 30. Tip portions of the turbine blades 50 are connected by the tip shroud 51 made in a ring shape on the whole and face the divider outer ring 11.

The annular turbine blade group and the annular turbine vane group constitute one stage by one set. That is, in the steam turbine 1, the annular turbine blade group and the annular turbine vane group are configured to be six stages. Then, a main flow M of the steam S is made so as to alternately flow through the turbine vane 40 and the turbine blade 50 in the direction of the rotation axis from the adjusting valve 20 side. In the following description, the direction of a rotation axis of the shaft body 30 is referred to as an "axial direction", the upstream side of the main flow in the axial direction is referred to as an "upstream side in the axial direction", and the downstream side of the main flow in the axial direction is referred to as a "downstream side in the axial direction".

Figure 2:
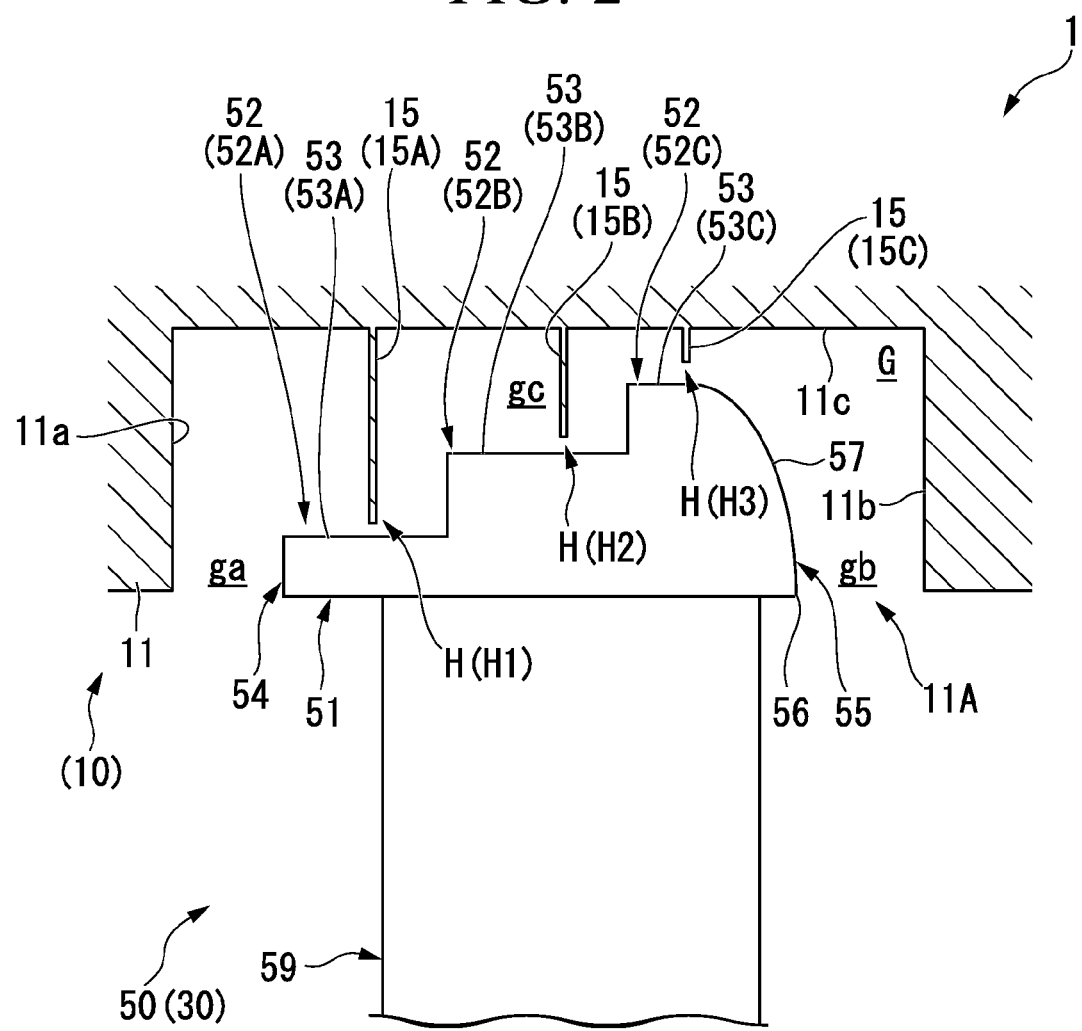
FIG. 2 is a main section enlarged cross-sectional view showing a main section I in FIG. 1.

FIG. 2 is a main section enlarged cross-sectional view showing a main section I in FIG. 1.

As shown in FIG. 2, step portions 52A to 52C are formed on the tip side of the tip shroud 51.

The step portions 52A to 52C are formed in a staircase pattern such that a height from the blade 59 gradually increases toward the downstream side in the axial direction from the upstream side in the axial direction. In the step portions 52A to 52C, outer peripheral surfaces (peripheral surfaces) 53A to 53C each extending in the circumferential direction and also being perpendicular to the radial direction configure a stepped outer peripheral surface of the tip shroud 51.

In the divider outer ring 11, an annular groove (an annular concave portion) 11A is formed at a site corresponding to the tip shroud 51, and the plurality of tip shrouds 51 connected in a ring shape is accommodated in the annular groove 11A in a state where a gap G is interposed therebetween.

The gap G is a gap in which the cross-sectional shape of a cross-section perpendicular to the circumferential direction is formed in a U-shape (or an inverted U-shape), as shown in FIG. 2, and an axial gap ga formed between a leading edge 54 of the tip shroud 51 and an upstream groove side surface 11a of the divider outer ring 11 and an axial gap gb formed between a trailing edge 55 of the tip shroud 51 and a downstream groove side surface 11b of the divider outer ring 11 are communicated with each other by a radial gap gc formed between the outer peripheral surfaces 53 (53A to 53C) of the tip shroud 51 and a groove bottom 11c of the divider outer ring 11.

In order to seal the gap G, three seal fins 15 (15A to 15C) extending so as to correspond one-to-one to the three step portions 52 (52A to 52C) are disposed on the groove bottom 11c in the annular groove 11A of the divider outer ring 11, and minute gaps H (H1 to H3) are formed between the tips of the seal fins 15 (15A to 15C) and the respective outer peripheral surfaces 53 (53A to 53C).

At the tip shroud 51, a guide curved surface 57 is formed between a trailing edge end portion 56 that is located on the main flow M side of the trailing edge 55 and comes into contact with the main flow M and the outer peripheral surface 53C of the step portion 52C.

The guide curved surface 57 is formed such that the cross-sectional contour of a cross-section intersecting the circumferential direction has a quarter elliptical shape. The guide curved surface 57 is made such that a curvature radius increases as it proceeds toward the downstream side in the axial direction from a starting end (a terminus of the outer peripheral surface 53C) in the downstream side in the axial direction of the minute gap H3, and connects the outer peripheral surface 53C and the trailing edge end portion 56.

Returning to FIG. 1, the bearing unit 60 includes a journal bearing apparatus 61 and a thrust bearing apparatus 62 and rotatably supports the shaft body 30.

Figure 3:
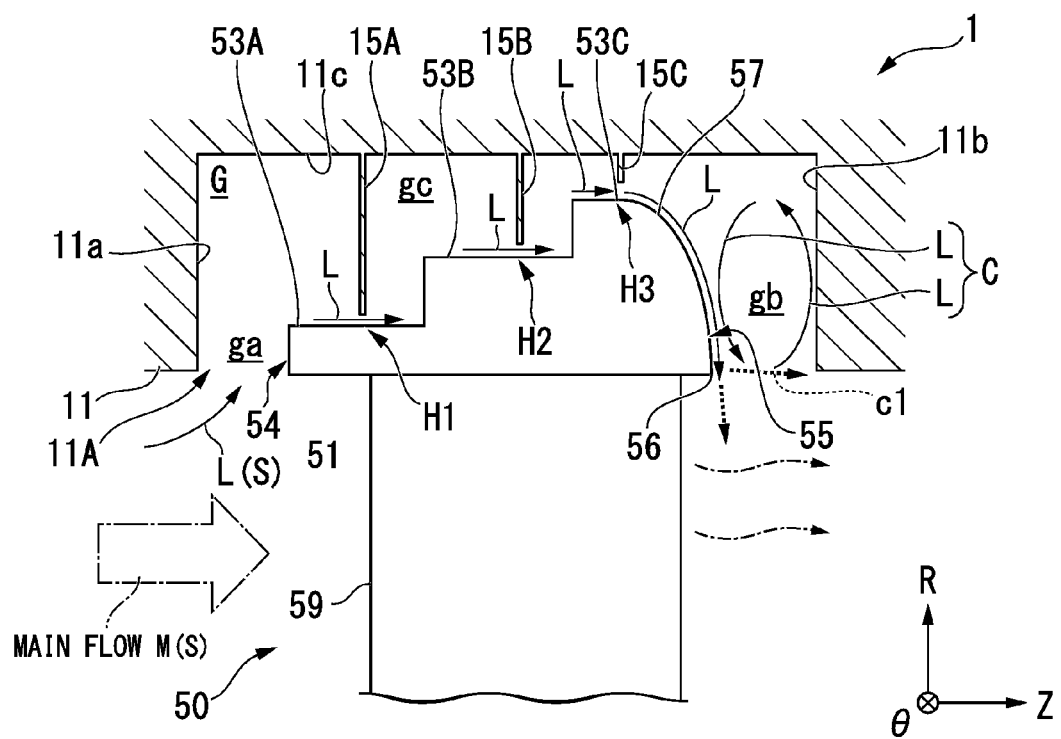
FIG. 3 is an explanatory diagram of an operation of the steam turbine 1 and a main section enlarged view of a cross-section along a plane intersecting a circumferential direction.

Next, an operation of the steam turbine 1 having the above-described configuration will be described using the drawings. FIG. 3 is an explanatory diagram of an operation of the steam turbine 1 and a main section enlarged view of a cross-section intersecting the circumferential direction.

First, if the adjusting valve 20 (refer to FIG. 1) enters an open state, the steam S flows into the internal space of the casing 10 from a boiler (not shown).

The steam S sequentially passes through the annular turbine vane group and the annular turbine blade group in each stage. At this time, pressure energy is converted into velocity energy by the turbine vane 40, most of the steam S passed through the turbine vane 40 flows between the turbine blades 50 constituting the same stage (the main flow M), and the velocity energy of the steam S is converted into rotational energy by the turbine blade 50, and thus a rotational force is applied to the shaft body 30. On the other hand, as shown in FIG. 3, some (for example, several %) of the steam S flows out from the turbine vane 40 and then flows into the gap G from the axial gap ga, thereby becoming leakage flow L.

The leakage flow L reaches a cavity between the seal fins 15B and 15C through the minute gaps H1 and H2. Then, the leakage flow L which has reached the cavity passes through the minute gap H3 so as to follow the outer peripheral surface 53C.

The leakage flow L passed through the minute gap H3 flows to the downstream side in the axial direction along the outer peripheral surface 53C and then flows to the trailing edge end portion 56 in a state of being stuck to the guide curved surface 57.

Figure 4:
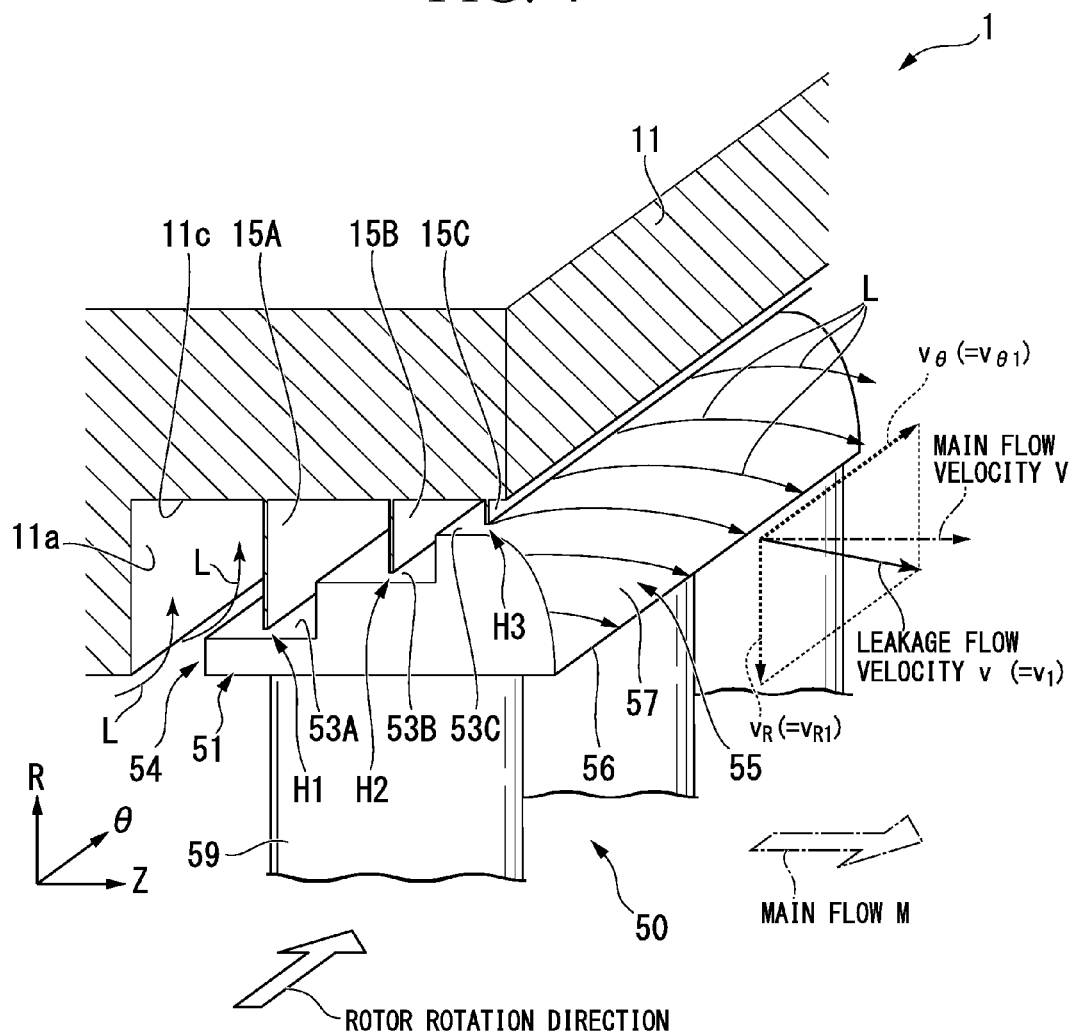
FIG. 4 is an explanatory diagram of an operation of the steam turbine 1 and an enlarged cross-sectional perspective view of a main section.

FIG. 4 is a main section enlarged cross-sectional perspective view for explaining an operation of the steam turbine 1 and FIG. 5 is a vector diagram showing main flow velocity V and leakage flow velocity v in the steam turbine 1.

Explaining the above-described operation in more detail, since the leakage flow L passed through the minute gap H3 does not apply rotational energy to the turbine blade 50, the leakage flow L retains most of the velocity energy applied thereto by the turbine vane 40. That is, a velocity component in the circumferential direction (a rotor rotation direction) becomes relatively large and the velocity component in the circumferential direction becomes larger than a circumferential direction velocity component of the turbine blade 50 (the tip shroud 51). Therefore, as shown in FIG. 4, the leakage flow L passed through the minute gap H3 flows radially inward and in the rotor rotation direction along the guide curved surface 57.

Figure 5A:
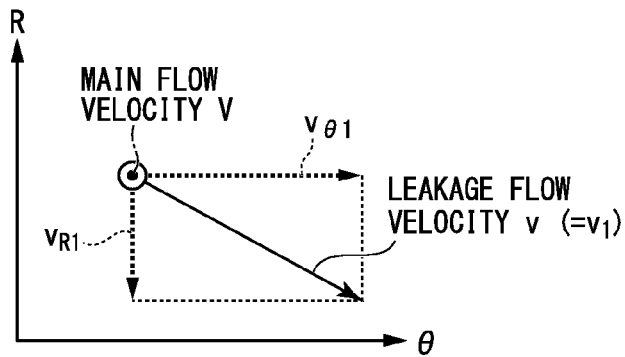
FIG. 5A is a vector diagram showing main flow velocity V and leakage flow velocity v in the steam turbine 1.
Figure 5B:
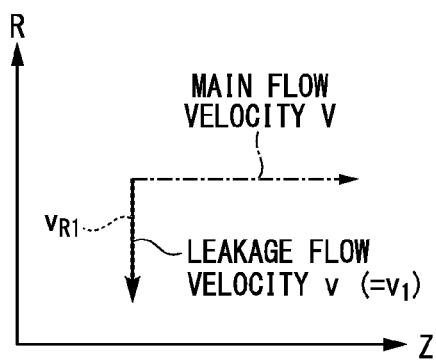
FIG. 5B is a vector diagram showing the main flow velocity V and the leakage flow velocity v in the steam turbine 1.
Figure 5C:
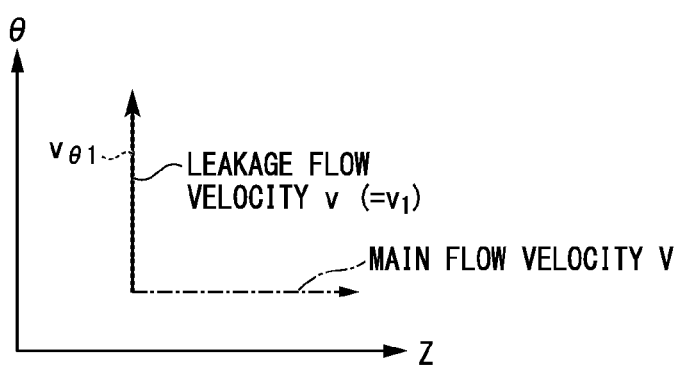
FIG. 5C is a vector diagram showing the main flow velocity V and the leakage flow velocity v in the steam turbine 1.

Then, the leakage flow L flows out from the trailing edge end portion 56 to the main flow M passed through the turbine blade 50. At this time, as shown in FIGS. 5A to 5C, the main flow velocity V of the main flow M has only an axial velocity component, whereas the leakage flow velocity v of the leakage flow L has a circumferential direction velocity component $v_0$ ($=v_{01}$) and a radial direction velocity component $v_R$ ($=v_{R1}$).

As shown in FIG. 3, while some of the leakage flow L flowing out from the trailing edge end portion 56 to the main flow M is mixed with the main flow M, some other drifts toward the downstream side in the axial direction from the upstream side in the axial direction by the main flow M and then comes into contact with the downstream groove side surface 11b of the annular groove 11A, thereby flowing from a radially inward side to a radially outward side.

In this manner, by the flow that is directed to the radially inward side along the guide curved surface 57, the flow that is directed to the downstream side in the axial direction along the main flow M, and the flow that is directed to the radially outward side substantially along the downstream groove side surface 11b, a forward vortex C flowing in the counterclockwise direction on the plane of paper of the drawing, as shown in FIG. 3, is formed in a space that is partitioned by the guide curved surface 57, the groove bottom 11c, and the downstream groove side surface 11b.

Since the forward vortex C does not flow back into the main flow M at the boundary between the gap G and a flow path of the main flow (an arrow c1 in FIG. 3) and does not draw the main flow M into the gap G along the trailing edge 55, the forward vortex C does not agitate the main flow M.

In this way, the steam turbine 1 efficiently operates.

As described above, according to the steam turbine 1, since the guide curved surface 57 formed between the outer peripheral surface 53C and the trailing edge end portion 56 guides the leakage flow L flowing along the outer peripheral surface 53C so as to cause the leakage flow L to follow the guide curved surface 57 from the outer peripheral surface 53C to the trailing edge end portion 56, the leakage flow L flows out from the trailing edge end portion 56 to the main flow M side, whereby the forward vortex C is formed. Since the forward vortex C does not flow back into the main flow M at the boundary between the gap G and the flow path of the main flow and does not draw the main flow M into the gap G along the trailing edge 55 of the tip shroud 51, the main flow M is not agitated.

Therefore, the generation of mixing loss can be suppressed, and thus turbine efficiency can be improved.

Figure 6:
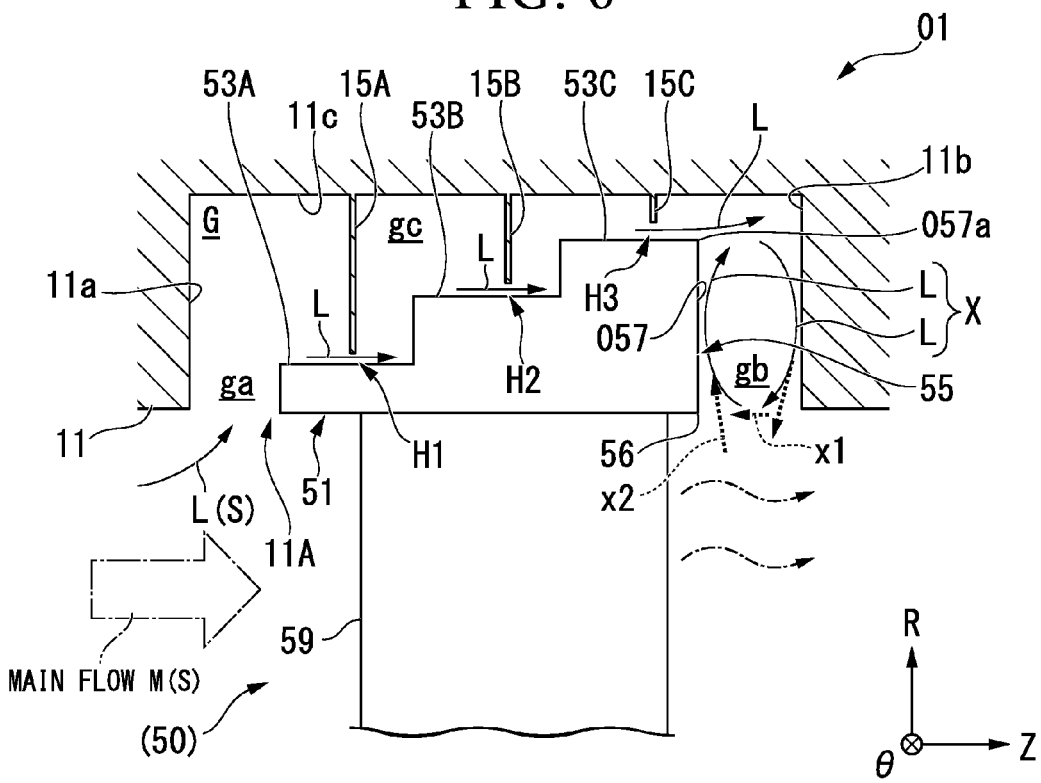
FIG. 6 is an enlarged cross-sectional view of a main section of a comparative example 01 of the steam turbine 1.

FIG. 6 is an enlarged cross-sectional view of a main section of a comparative example 01 of the steam turbine 1. In addition, in the comparative example of FIG. 6, a constituent element corresponding to that of the steam turbine 1 is denoted by the same sign.

As shown in FIG. 6, in a case where the outer peripheral surface 53C and the trailing edge end portion 56 are connected by an end face 057 intersecting the axial direction without forming the guide curved surface 57 therebetween, the leakage flow L flowing along the outer peripheral surface 53C is separated at a corner portion 057a that is formed between the end face 057 and the outer peripheral surface 53C. Then, the leakage flow L flows to the downstream side in the axial direction at approximately the same position as the outer peripheral surface 53C in the radial direction, reaches the downstream groove side surface 11b, and is then directed to the radially inward side along the downstream groove side surface 11b, whereby a reverse vortex X flowing in the opposite direction to the forward vortex C is formed.

That is, if the leakage flow L flowing along the outer peripheral surface 53C is separated at a position separated from the main flow L, and thus the reverse vortex X is formed, the reverse vortex X flows back with respect to the main flow M at the boundary between the gap G and the flow path of the main flow (an arrow x1 in FIG. 6) and draws the main flow M into the gap G at the trailing edge 55 of the tip shroud 51 (an arrow x2), thereby agitating the main flow M to cause the mixing loss.

However, since the forward vortex C that is formed by the configuration of the steam turbine 1 does not flow back with respect to the main flow M at the boundary between the gap G and the flow path of the main flow (the arrow c1 in FIG. 3) and does not draw the main flow M into the gap G along the trailing edge 55 of the tip shroud 51, the main flow M is not agitated and thus the generation of the mixing loss can be suppressed, and thus the turbine efficiency can be improved.

In addition, in this embodiment, the guide curved surface 57 is formed such that the cross-sectional contour of the cross-section intersecting the circumferential direction has a quarter elliptical shape. However, the contour may also be an elliptical contour having a shape equivalent to another portion of an elliptical outer periphery.

Figure 7:
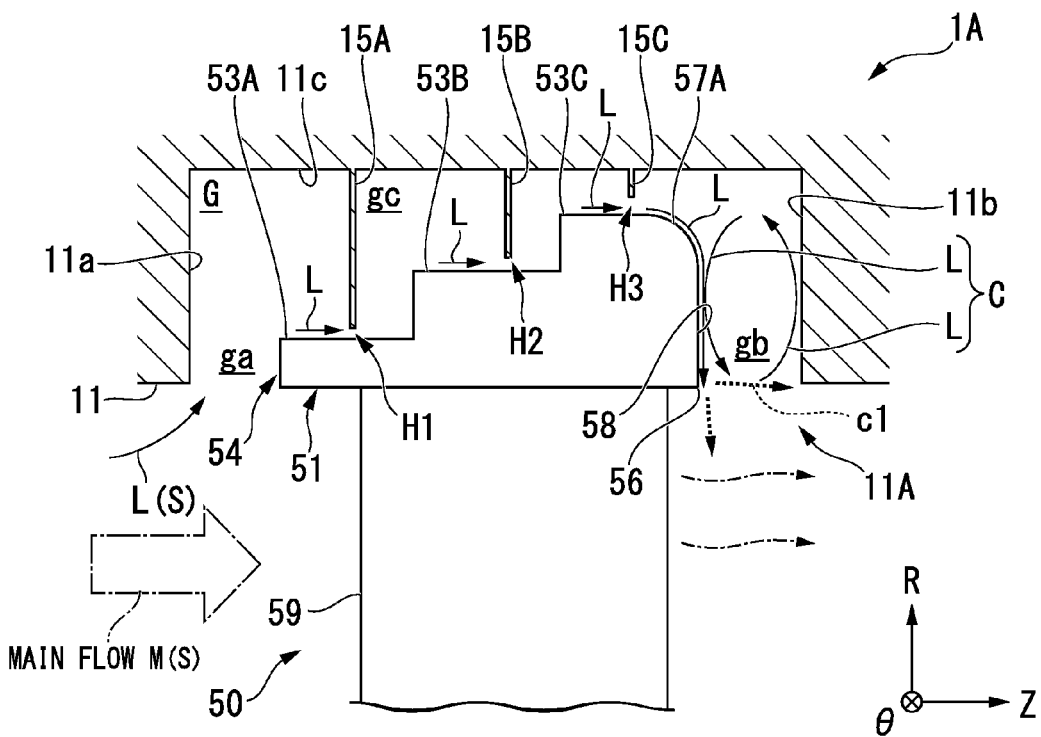
FIG. 7 is an enlarged cross-sectional view of a main section of a modified example 1A of the steam turbine 1.

Further, as in a modified example 1A shown in, for example, FIG. 7, a guide curved surface 57A may also be formed in an arc shape (in the example of FIG. 7, a quarter arc shape).

Further, in this embodiment, the guide curved surface 57 is configured to connect the outer peripheral surface 53C and the trailing edge end portion 56. However, as in the modified example 1A shown in FIG. 7, the guide curved surface 57A and the trailing edge end portion 56 may also be connected by an end face 58 intersecting the axial direction. That is, even if the guide curved surface 57 makes the leakage flow L reach the trailing edge end portion 56 along another surface (for example, the end face 58) after outflow from the guide curved surface 57A without having to make the leakage flow L follow only the guide curved surface 57 and having to be formed so as to guide the leakage flow L to the trailing edge end portion 56, the same effect as the above-described effect can be obtained. That is, the guide curved surface 57A may be formed such that the leakage flow L finally reaches the trailing edge end portion 56 along another surface that is continuous with the guide curved surface 57A. In other words, a case where the guide curved surface 57A guides the leakage flow L flowing along the outer peripheral surface 53C, so as to follow the guide curved surface 57A and another surface from the outer peripheral surface 53C to the trailing edge end portion 56, is also included in the present invention.

Further, in this embodiment, the outer peripheral surface 53C is formed so as to be perpendicular to the radial direction. However, the present invention can also be applied to an outer peripheral surface formed so as to gradually expand or reduce a diameter as it proceeds to the downstream side in the axial direction. That is, as long as the outer peripheral surface 53C intersects the radial direction, the present invention can be applied thereto.

(Second Embodiment)

Next, a steam turbine 2 according to a second embodiment of the present invention will be described using the drawings.

Figure 8:
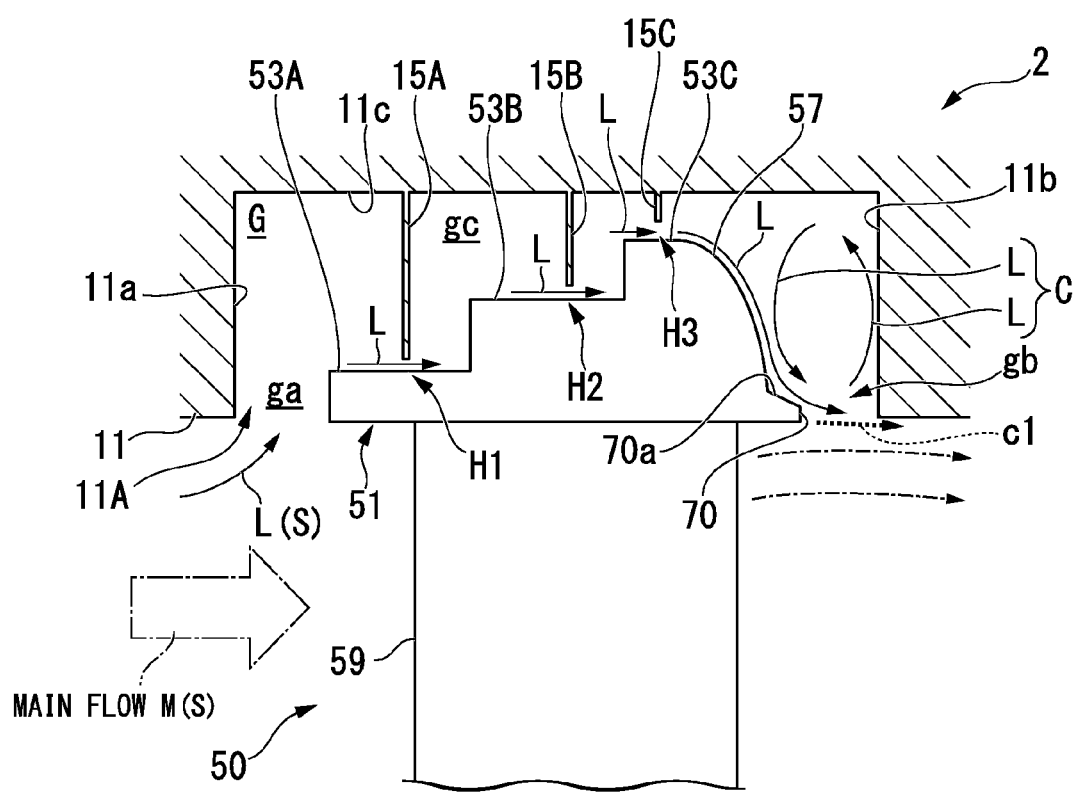
FIG. 8 is an enlarged cross-sectional view of a main section of a steam turbine 2 according to a second embodiment of the present invention.
Figure 9:
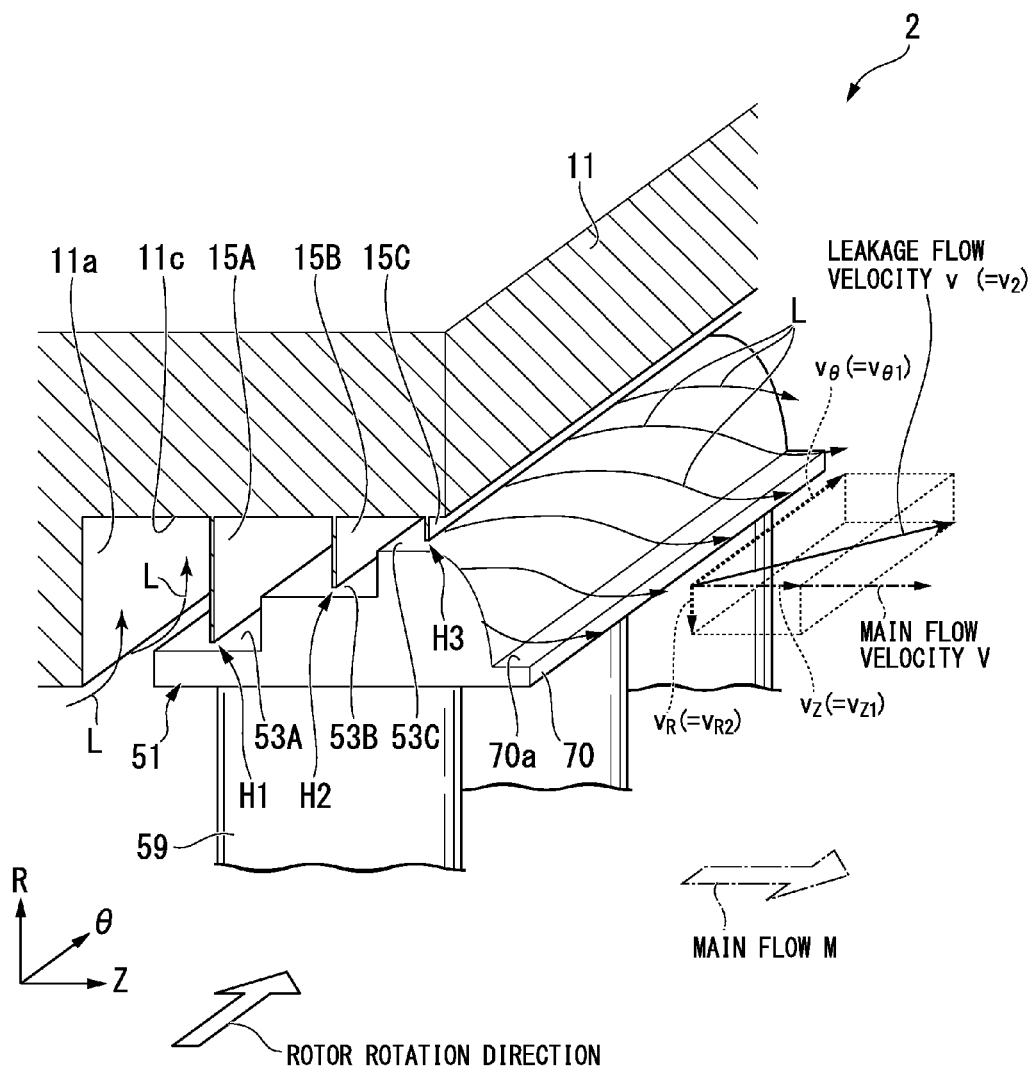
FIG. 9 is an enlarged cross-sectional perspective view of a main section of the steam turbine 2.

FIG. 8 is an enlarged cross-sectional view of a main section of the steam turbine 2 and FIG. 9 is an enlarged cross-sectional perspective view of a main section of the steam turbine 2. In addition, in FIGS. 8 and 9, the same constituent elements as those in FIGS. 1 to 7 are denoted by the same signs and a description thereof is omitted here.

As shown in FIG. 8, the steam turbine 2 is different from the steam turbine 1 in terms of a trailing edge end portion 70 equivalent to the trailing edge end portion 56 of the steam turbine 1.

The trailing edge end portion 70 is made of an axial fin extending from the tip shroud 51 to the downstream side in the axial direction, and thus the axial gap gb is narrowed. A tapered surface 70a that is connected to the guide curved surface 57 and also gradually directed to the radially inward side as it proceeds from the guide curved surface 57 to the downstream side in the axial direction is formed at the radially outward side of the trailing edge end portion 70.

As shown in FIG. 9, the leakage flow L passed through the minute gap H3 flows toward the trailing edge end portion 70 along the guide curved surface 57. The leakage flow L which has reached the trailing edge end portion 70 is guided by the trailing edge end portion 70, thereby greatly changing the direction of the flow to the downstream side in the axial direction, then flows along the tapered surface 70a, and flows out from the axial gap gb to the main flow M side.

Figure 10A:
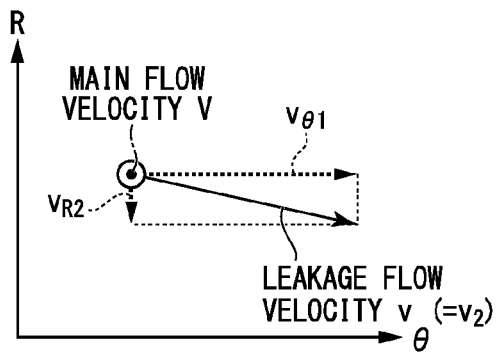
FIG. 10A is a vector diagram showing the main flow velocity V and the leakage flow velocity v in the steam turbine 2.
Figure 10B:
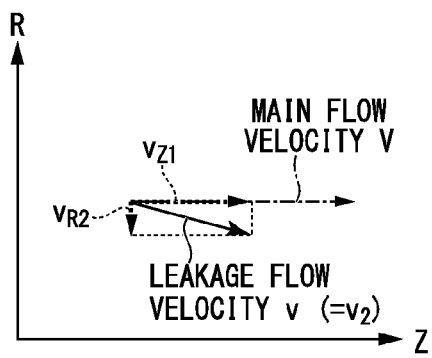
FIG. 10B is a vector diagram showing the main flow velocity V and the leakage flow velocity v in the steam turbine 2.
Figure 10C:
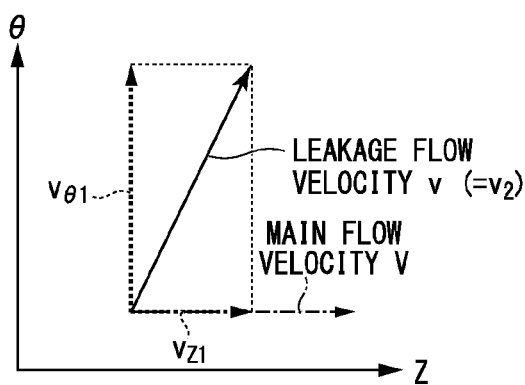
FIG. 10C is a vector diagram showing the main flow velocity V and the leakage flow velocity v in the steam turbine 2.

FIGS. 10A to 10C are vector diagrams showing the main flow velocity V and the leakage flow velocity v in the steam turbine 2.

Explaining in more detail the above-described operation, the leakage flow L which has reached the trailing edge end portion 70 at leakage flow velocity $v_1$ [the radial direction velocity component $v_{R1}$, the circumferential direction velocity component $v_{\theta 1}$, and the axial direction velocity component 0] (refer to FIGS. 5A to 5C) is guided by the trailing edge end portion 70, thereby flowing to the main flow M at leakage flow velocity $v_2$ [a radial direction velocity component $v_{R2}$, the circumferential direction velocity component $v_{\theta 1}$, and an axial direction velocity component $v_{z1}$].

That is, in the leakage flow L flowing out from the guide curved surface 57, while a portion of the radial direction velocity component $v_R$ is converted into an axial direction velocity component $v_z$ by the trailing edge end portion 70, and thus the radial direction velocity component $v_R$ significantly decreases from $v_{R1}$ to $v_{R2}$ (refer to FIGS. 10A to 10C and FIGS. 5A and 5B), the axial direction velocity component $v_z$ increases from 0 to $v_{z1}$ (refer to FIGS. 10A to 10C and FIGS. 5B and 5C).

Therefore, since the leakage flow L flows out from the trailing edge end portion 70 to the downstream side in the axial direction in a state where the axial direction velocity component has increased to $v_{z1}$, the forward vortex C is strongly formed, thereby pushing the leakage flow L flowing along the guide curved surface 57 against the guide curved surface 57.

Further, the radial direction velocity component $v_R$ decreases from $v_{R1}$ to $v_{R2}$ and a difference of which with respect to the radial direction velocity component (≈0) of the main flow M decreases. That is, the leakage flow L smoothly joins the main flow M while suppressing the agitation of the main flow M.

As described above, according to the steam turbine 2, since the trailing edge end portion 70 is made of an axial fin extending in the axial direction, a portion of the radial direction velocity component $v_R$ is converted into the axial direction velocity component $v_z$. Thus, the forward vortex C is strongly formed, thereby pushing the leakage flow L flowing along the guide curved surface 57 against the guide curved surface 57. Therefore, it becomes further difficult for the leakage flow L to be separated, and thus the effect of suppressing the agitation of the main flow M can be stably obtained.

Further, since the trailing edge end portion 70 is made of the axial fin extending in the axial direction, the radial direction velocity component $v_R$ of the leakage flow L guided to the trailing edge end portion 70 is diminished. Thus, a difference between the radial direction velocity component (≈0) of the main flow M and the radial direction velocity component $v_R$ ($=v_{R2}<v_{R1}$) of the leakage flow L becomes small. Therefore, since the leakage flow L can smoothly join the main flow M while suppressing the agitation of the main flow M, the mixing loss can be further reduced.

Figure 11:
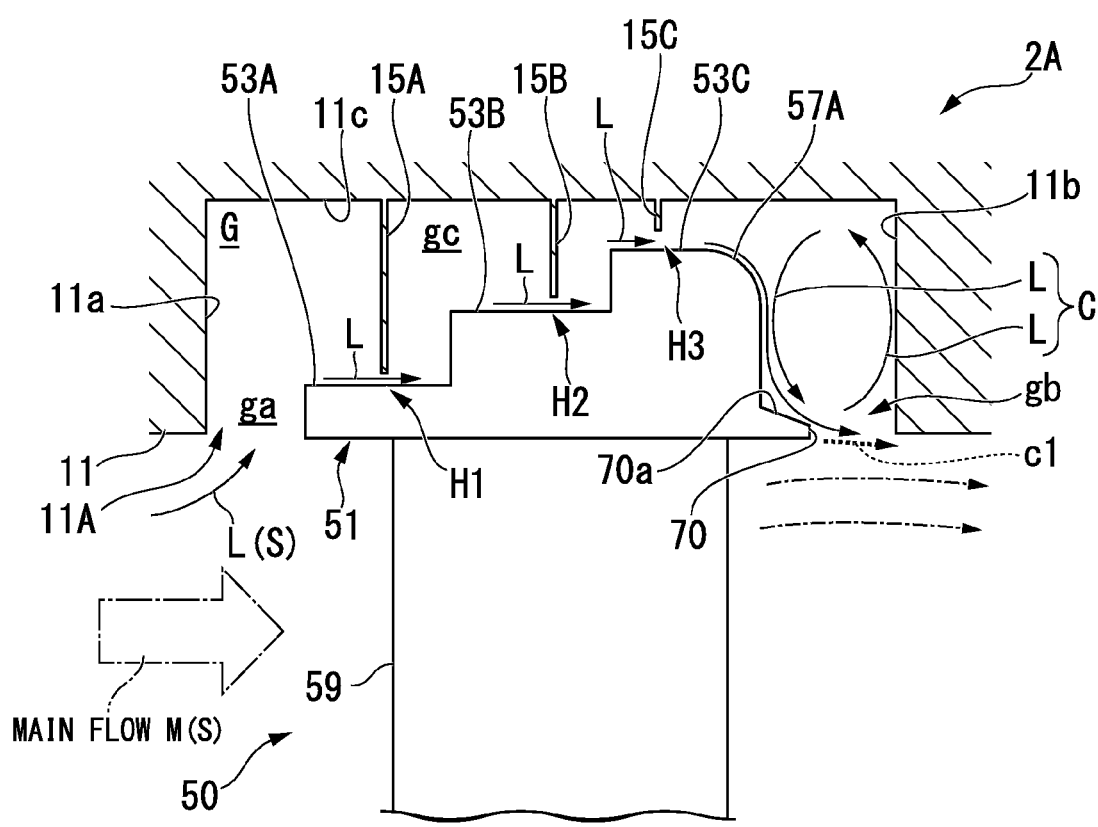
FIG. 11 is an enlarged cross-sectional view of a main section of a modified example 2A of the steam turbine 2.

In addition, also in this embodiment, as in a modified example 2A shown in FIG. 11, the guide curved surface 57A may also be used.

Further, the guide curved surface 57 and the tapered surface 70a may be smoothly continuous so as to have curvature and may also be discontinuously configured such that a corner is formed.

Further, a tip of the axial fin may have an end face (refer to FIG. 8) intersecting the axial direction and may also be formed as a sharp edge without having an end face.

(Third Embodiment)

Next, a steam turbine 3 according to a third embodiment of the present invention will be described using the drawings.

Figure 12:
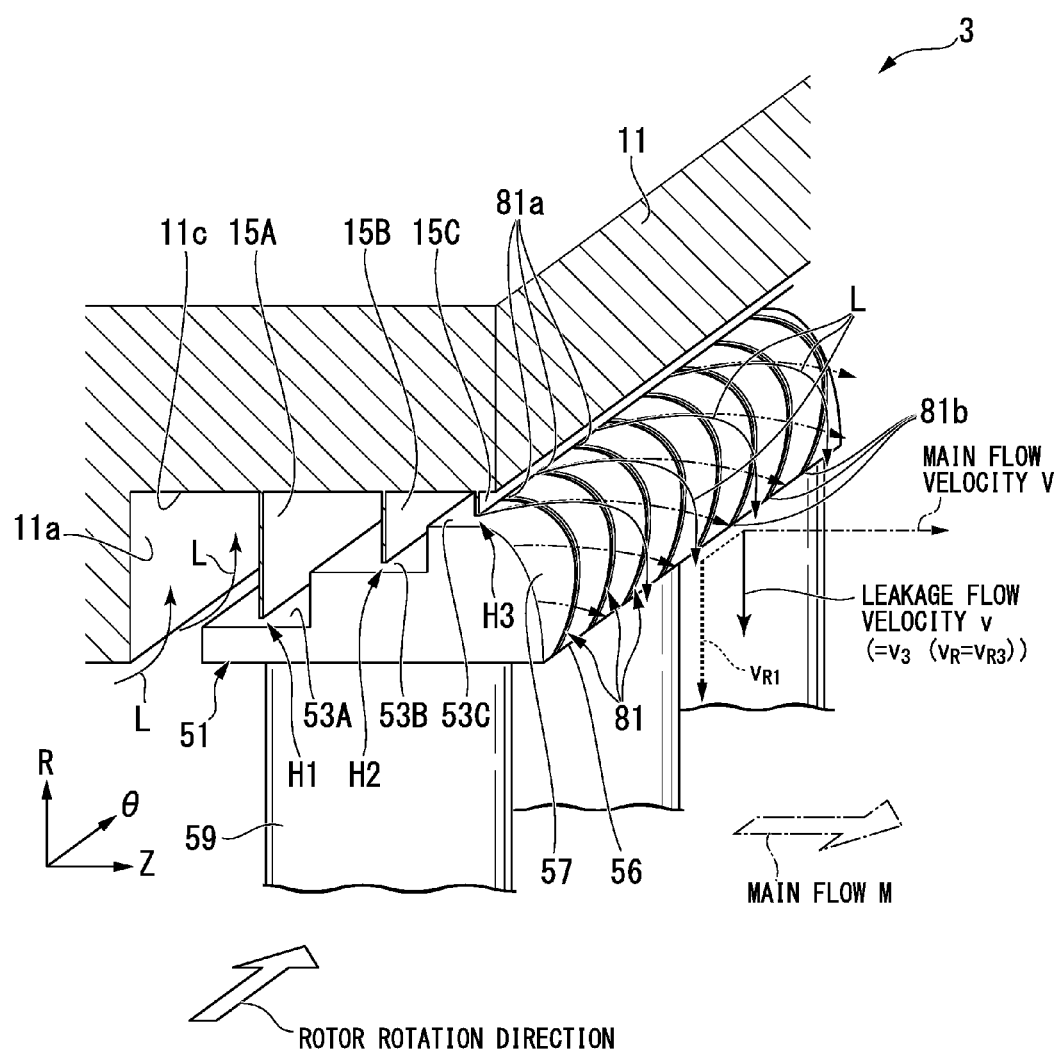
FIG. 12 is an enlarged cross-sectional perspective view of a main section of a steam turbine 3 according to a third embodiment of the present invention.
Figure 13:
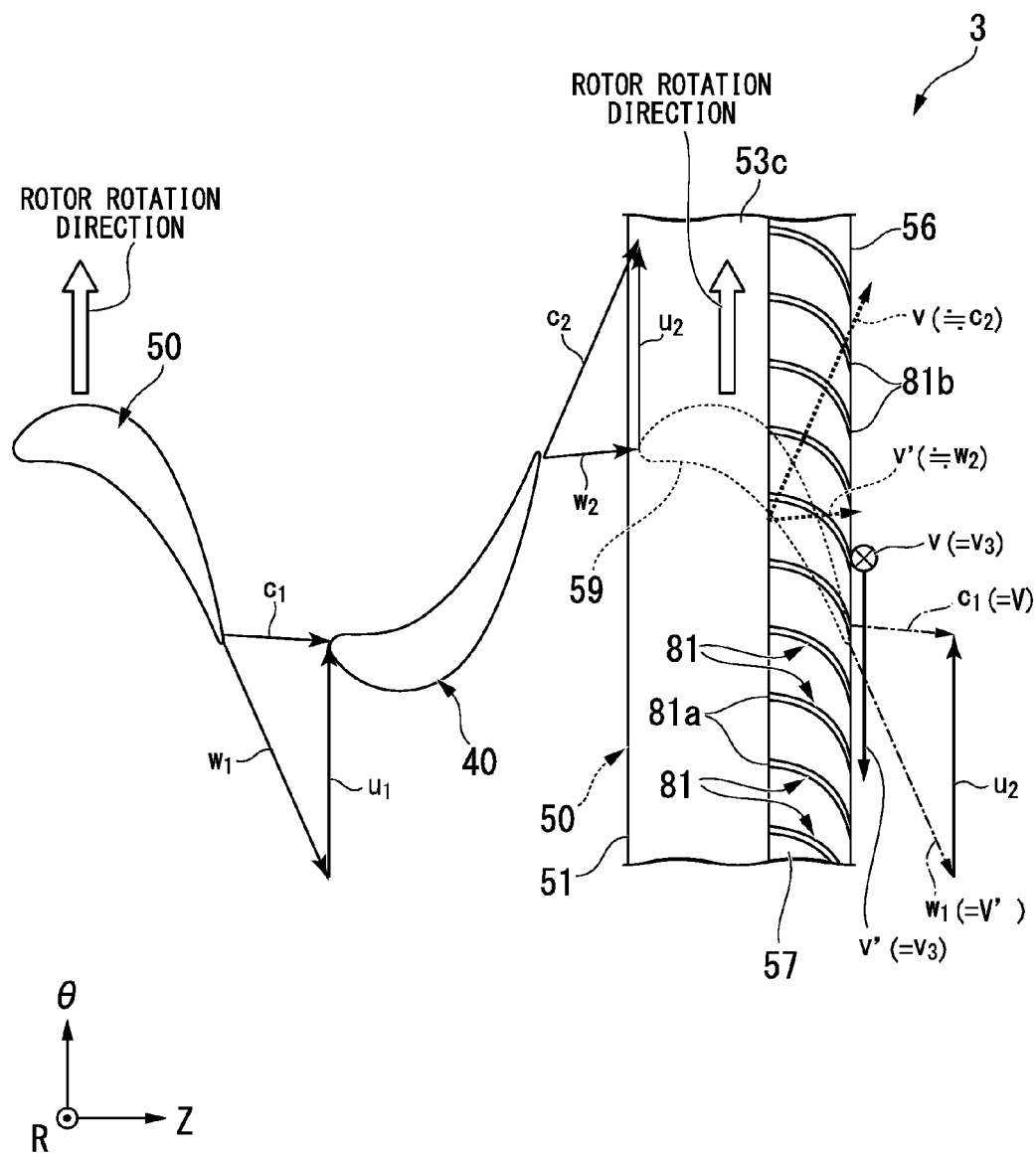
FIG. 13 is a blade row diagram of the steam turbine 3.

FIG. 12 is an enlarged cross-sectional perspective view of a main section of the steam turbine 3 and FIG. 13 is a blade row diagram of the steam turbine 3. In addition, in FIGS. 12 and 13, the same constituent elements as those in FIGS. 1 to 11 are denoted by the same signs and description thereof is omitted.

As shown in FIG. 12, the steam turbine 3 is different from the steam turbine 1 described above in that a guide pathway 81 is formed on the guide curved surface 57 of the steam turbine 1.

The guide pathway 81 is formed in a groove shape, as shown in FIG. 12, and extends in a curved manner from a starting end of the guide curved surface 57 (a terminus of the outer peripheral surface 53C) to the trailing edge end portion 56 when viewed from the radially outward side to the radially inward side. More specifically, as shown in FIG. 13, an inflow portion 81a for inflow of the leakage flow L from the outer peripheral surface 53C and an outflow portion 81b for outflow of the leakage flow L at the trailing edge end portion 56 are shifted in the opposite direction to the rotor rotation direction. In other words, the outflow portion 81b of the guide pathway 81 is formed closer to the downstream side in the rotor rotation direction than the inflow portion 81a.

The guide pathway 81 is formed in a plurality spaced to each other in the circumferential direction in the guide curved surface 57.

In the guide pathway 81, the number of guide pathways 81 and the circumferential positions and the extending directions of the inflow portion 81a and the outflow portion 81b are set such that the circumferential direction velocity component $v_\theta$ is reduced (described later) when the leakage flow L flowing into the gap G flows out to the main flow M side, on the basis of rated speed set in the steam turbine 3 or the circumferential position of the turbine blade 50.

Subsequently, an operation of the steam turbine 3 will be described.

As in a velocity triangle shown in FIG. 13, the steam S having relative velocity $w_1$ at an outflow portion of the turbine blade 50 of the upstream stage flows out from the turbine blade 50 at absolute velocity $c_1$ due to rotation velocity $u_1$ of the turbine blade 50. Subsequently, the steam S flowing in the turbine vane 40 flows in the turbine vane 40 at the absolute velocity $c_1$, then changes the direction of the flow by the turbine vane 40, and flows out from the turbine vane 40 at absolute velocity $c_2$. Then, the steam S flowing out at the absolute velocity $c_2$ flows in the turbine blade 50 at relative velocity $w_2$ due to rotation velocity $u_2$ of the turbine blade 50.

The main flow M which applied rotational energy to the turbine blade 50 flows out from the turbine blade 50 at the absolute velocity $c_2$ (=V) and the relative velocity $w_2$ (=V') due to the rotation velocity $u_2$ of the turbine blade 50, as shown in FIG. 13.

On the other hand, since the leakage flow L does not apply most of rotational energy to the turbine blade 50, the leakage flow L passes through the minute gap H3 at the leakage flow velocity v (absolute velocity v and relative velocity v') retaining most of velocity energy (the absolute velocity $c_2$ and the relative velocity $w_2$) when flowing out from the turbine vane 40.

Some flowing into the guide pathway 81, of the leakage flow L passed through the minute gap H3, is applied with a circumferential direction velocity component (a negative velocity component) in the opposite direction to the rotation direction (a positive velocity component) of the turbine blade 50 in the process of flowing through the guide pathway 81, whereby the circumferential direction velocity component decreases. When viewed from the turbine blade 50 side, the leakage flow L flows through the guide pathway 81, whereby a circumferential direction velocity component is applied from the leakage flow L to the rotation direction of the turbine blade 50, whereby rotational energy is recovered through the leakage flow L.

Therefore, the velocity energy of the entire leakage flow L flowing through the guide curved surface 57 becomes small compared to the velocity energy when flowing out from the turbine vane 40.

Therefore, velocity $v_3$ of the leakage flow L becomes small compared to the velocity $v_1$ of the leakage flow L in the first embodiment described above.

In this way, the leakage flow L flows out from the trailing edge end portion 56 to the main flow M at leakage flow velocity $v_3$ (the absolute velocity v and the relative velocity v').

Figure 14A:
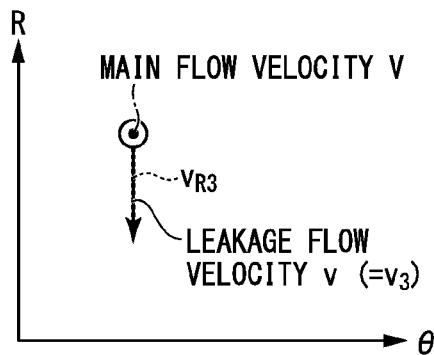
FIG. 14A is a vector diagram showing the velocities of the main flow velocity V and the leakage flow velocity v in the steam turbine 3.
Figure 14B:
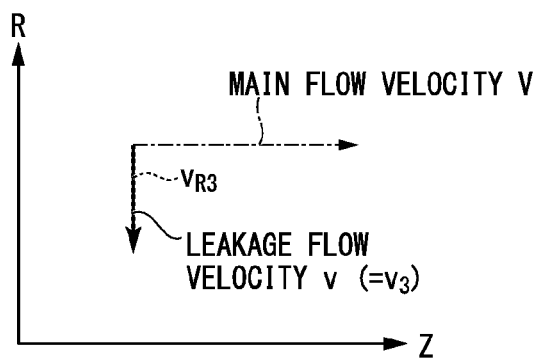
FIG. 14B is a vector diagram showing the velocities of the main flow velocity V and the leakage flow velocity v in the steam turbine 3.
Figure 14C:
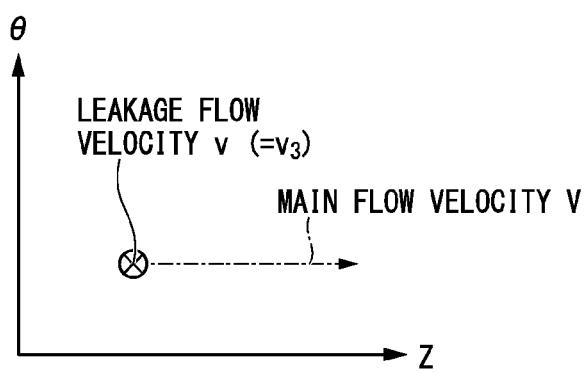
FIG. 14C is a vector diagram showing the velocities of the main flow velocity V and the leakage flow velocity v in the steam turbine 3.

FIGS. 14A to 14C are vector diagrams showing the main flow velocity V and the leakage flow velocity v in the steam turbine 3.

As shown in FIGS. 14A to 14C, if the leakage flow velocity $v_1$ (the first embodiment) and the leakage flow velocity $v_3$ when reaching the trailing edge end portion 56 are compared with each other, the circumferential direction velocity component $v_\theta$ decreases, a difference of which with respect to the circumferential direction velocity component of the main flow M decreases, and thus the two substantially coincide with each other.

Further, a velocity component $V_3 = (V_{R3}^2 + V_{\theta 3}^2)^{0.5}$ that is perpendicular to the main flow M becomes small compared to a velocity component $V_1 = (V_{R1}^2 + V_{\theta 1}^2)^{0.5}$ in the first embodiment.

Therefore, the leakage flow L smoothly joins the main flow M.

As described above, according to the steam turbine 3, since the guide pathway 81 performing guidance in the opposite direction to the relative rotation direction of the tip shroud 51 with respect to the divider outer ring 11 is formed, the circumferential direction velocity component $v_\theta$ in the opposite direction is given to the leakage flow L flowing in a relative rotation direction, and thus the circumferential direction velocity component $v_0$ of the leakage flow L becomes small. Therefore, since it is possible to make the leakage flow L smoothly join the main flow M while suppressing the agitation of the main flow M, the mixing loss can be further reduced.

Further, since the velocity energy of the leakage flow L can be recovered by the guide pathway 81, the turbine efficiency can be improved.

In addition, in this embodiment, the guide pathway 81 is formed in a groove shape. However, even if the guide pathway 81 is formed by, for example, a protrusion wall (or a vane-shaped body) protruding in the normal direction of the guide curved surface 57, the same effect as the above-described effect can be obtained.

Further, also in this embodiment, the guide curved surface 57A may also be used in place of the guide curved surface 57 (refer to FIGS. 7 and 11). In addition, in a case where the guide curved surface 57A and the trailing edge end portion 56 are connected by the end face 58, a guide pathway may also be formed on the end face 58.

(Fourth Embodiment)

Next, a steam turbine 4 according to a fourth embodiment of the present invention will be described using the drawings.

Figure 15:
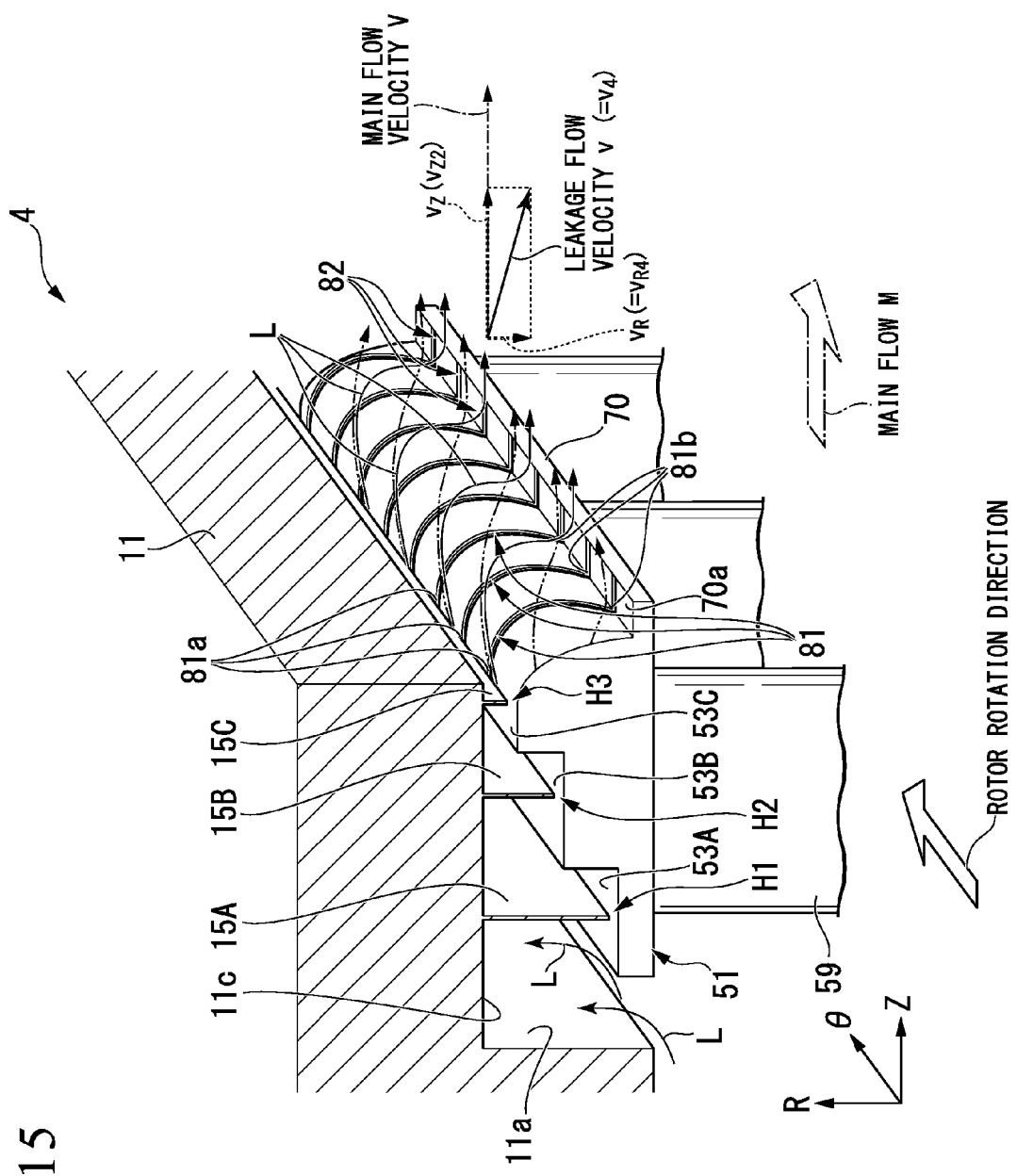
FIG. 15 is an enlarged cross-sectional perspective view of a main section of a steam turbine 4 according to a fourth embodiment of the present invention.
Figure 16:
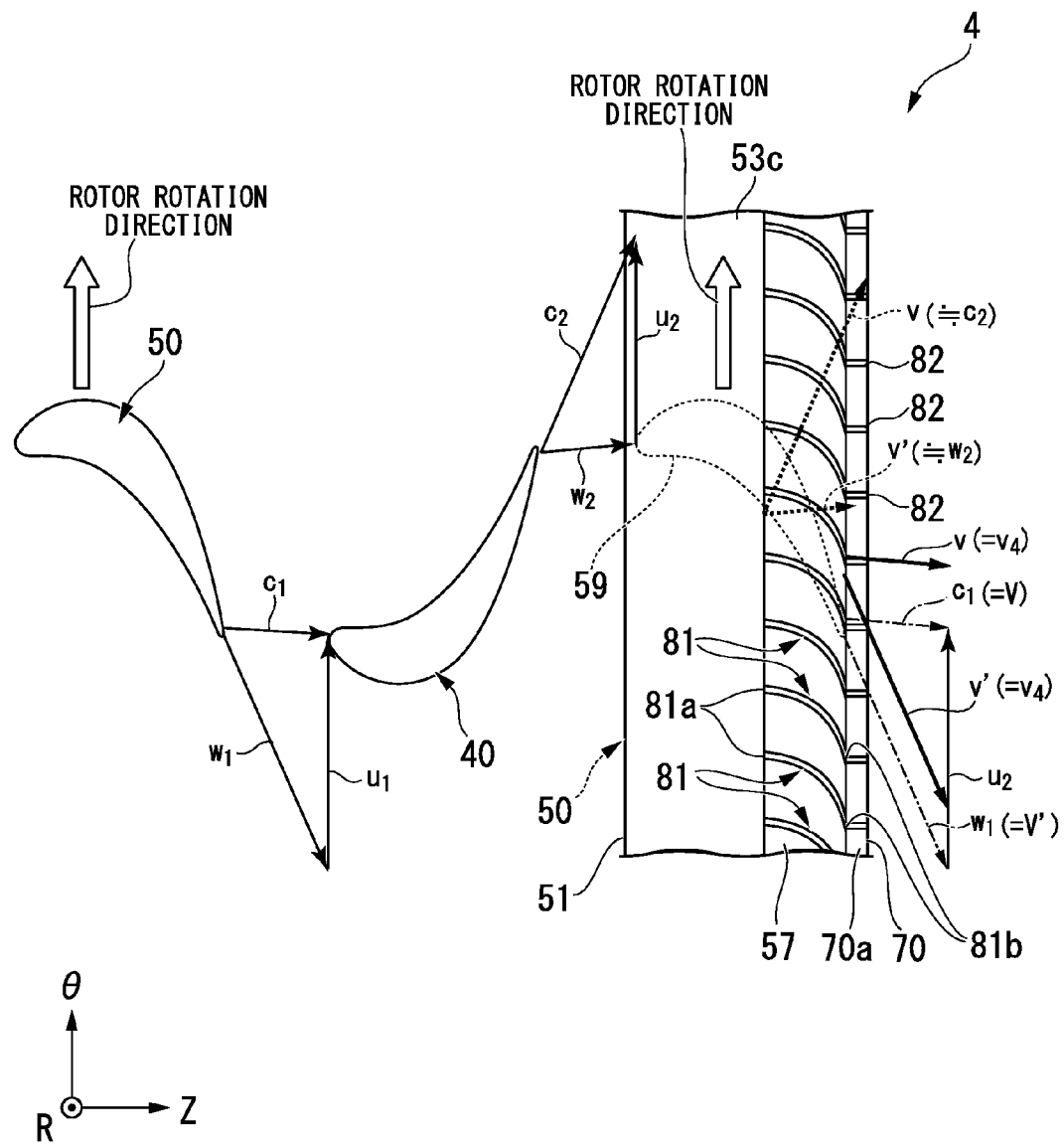
FIG. 16 is a blade row diagram of the steam turbine 4.

FIG. 15 is an enlarged cross-sectional perspective view of a main section of the steam turbine 4 and FIG. 16 is a blade row diagram of the steam turbine 4. In addition, in FIGS. 15 and 16, the same constituent elements as those in FIGS. 1 to 14C are denoted by the same signs and a description thereof is omitted here.

As shown in FIG. 15, the steam turbine 4 has a configuration in which the trailing edge end portion 70 described in the second embodiment and the guide pathway 81 described in the third embodiment are applied in a superimposed manner.

In the steam turbine 4, an auxiliary guide pathway 82 communicating with the guide pathway 81 at the upstream side in the axial direction and opened to the gap G at the downstream side in the axial direction is formed on the tapered surface 70a of the trailing edge end portion 70.

Subsequently, an operation of the steam turbine 4 will be described.

As shown in FIG. 16, the main flow M which has applied rotational energy to the turbine blade 50 flows out from the turbine blade 50 at the absolute velocity $c_2$ (=V) and the relative velocity $w_2$ (=V') due to the rotation velocity $u_2$ of the turbine blade 50.

On the other hand, the leakage flow L flows in the guide curved surface 57 and the guide pathway 81 at the leakage flow velocity v (the absolute velocity v and the relative velocity v') retaining most of the velocity energy (the absolute velocity $c_2$ and the relative velocity $w_2$) when flowing out from the turbine vane 40.

The leakage flow L is applied with the circumferential direction velocity component $v_0$ in the opposite direction to the rotation direction of the turbine blade 50 in the guide pathway 81, whereby the circumferential direction velocity component $v_\theta$ of the entire leakage flow L decreases.

The leakage flow L which has reached the trailing edge end portion 70 is guided by the trailing edge end portion 70, thereby greatly changing the direction of the flow to the downstream side in the axial direction, and while the radial direction velocity component $v_R$ significantly decreases to $v_{R4}$, the axial direction velocity component $v_z$ increases from 0 to $v_{z1}$.

Then, the leakage flow L flows out from the axial gap gb to the main flow M side, thereby joining the main flow M so as to follow the main flow M.

Figure 17A:
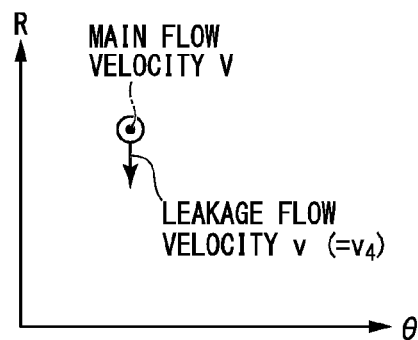
FIG. 17A is a vector diagram showing the velocities of the main flow velocity V and the leakage flow velocity v in the steam turbine 4.
Figure 17B:
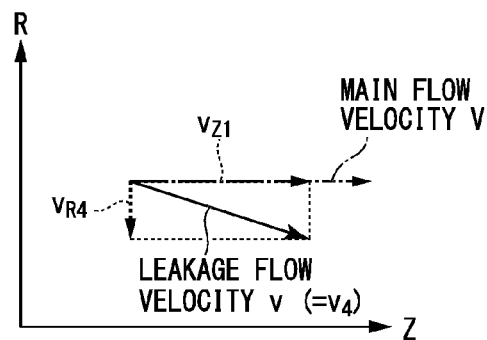
FIG. 17B is a vector diagram showing the velocities of the main flow velocity V and the leakage flow velocity v in the steam turbine 4.
Figure 17C:
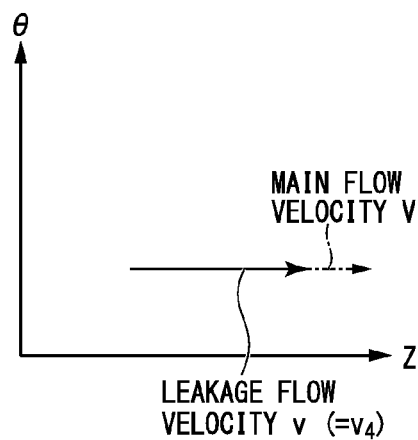
FIG. 17C is a vector diagram showing the velocities of the main flow velocity V and the leakage flow velocity v in the steam turbine 4.

FIGS. 17A to 17C are vector diagrams showing the main flow velocity V and the leakage flow velocity v in the steam turbine 4.

As shown in FIGS. 17A to 17C, if the leakage flow velocity $v_1$ (the first embodiment) and leakage flow velocity $v_4$ when flowing out to the main flow M are compared with each other, the circumferential direction velocity component $v_\theta$ significantly decreases from $v_{\theta 1}$. In addition, while the radial direction velocity component $v_R$ significantly decreases from $v_{R1}$ to $v_{R4}$, the axial direction velocity component $v_z$ increases from 0 to $v_{z1}$.

That is, in all of the circumferential direction velocity component $v_\theta$, the radial direction velocity component $V_R$, and the axial direction velocity component $v_z$ of the leakage flow velocity v, a difference with respect to the velocity component in each direction of the main flow velocity V is reduced, and therefore, the leakage flow L very smoothly joins the main flow M in a state where the agitation of the main flow M is further suppressed.

As described above, according to the steam turbine 4, since the leakage flow L very smoothly joins the main flow M in a state where the agitation of the main flow M is further suppressed, the mixing loss can be very effectively reduced, and thus the turbine efficiency can be significantly increased.

Further, since the forward vortex C is strongly formed by an increase in the axial direction velocity component $v_z$, and the leakage flow L flowing along the guide curved surface 57 is pushed against the guide curved surface 57, it becomes further difficult for the leakage flow L to be separated, and thus the effect of suppressing the agitation of the main flow M can be stably obtained.

Further, since the velocity energy of the leakage flow L can be recovered by the guide pathway 81 and the auxiliary guide pathway 82, the turbine efficiency can be improved.

(Simulation)

Here, the results of a simulation performed with respect to the relationship between the turbine efficiency and a ratio of the leakage flow rate to the flow rate of the main flow according to the presence or absence of the guide curved surface 57 will be described.

Figure 18:
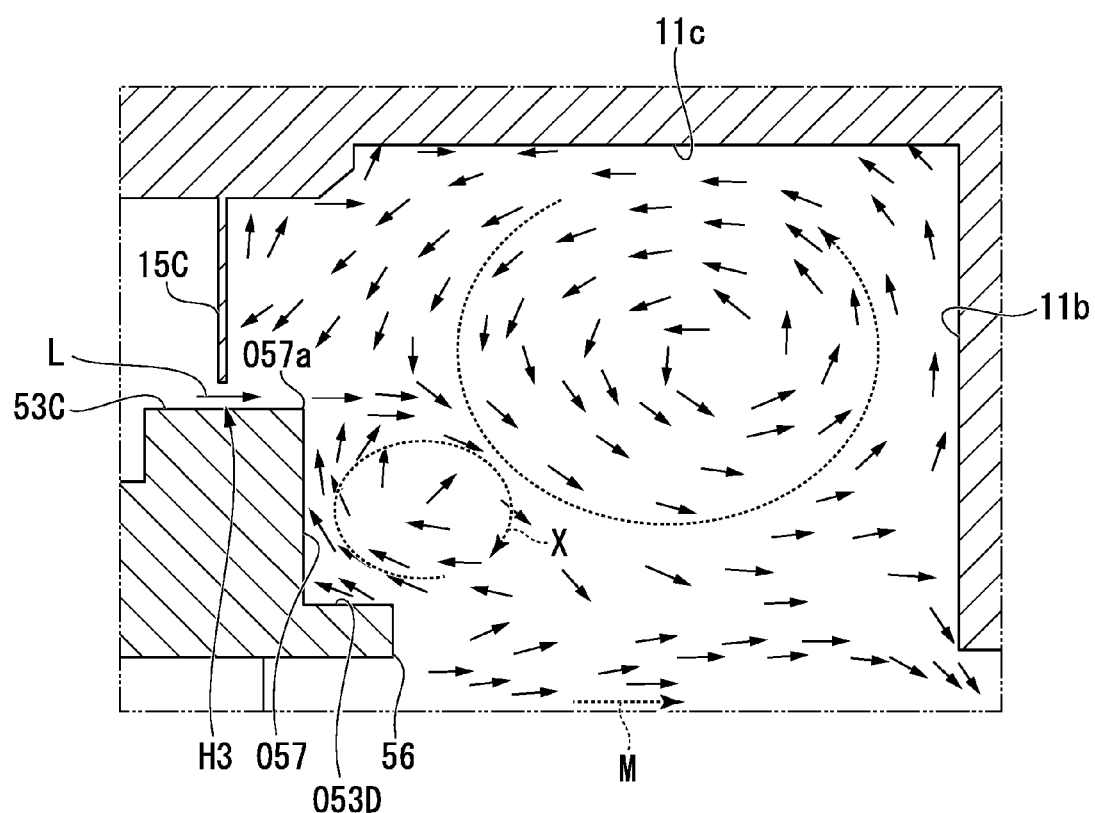
FIG. 18 is an analysis result of a model 1 in which a guide curved surface 57 according to the invention is omitted.
Figure 19:
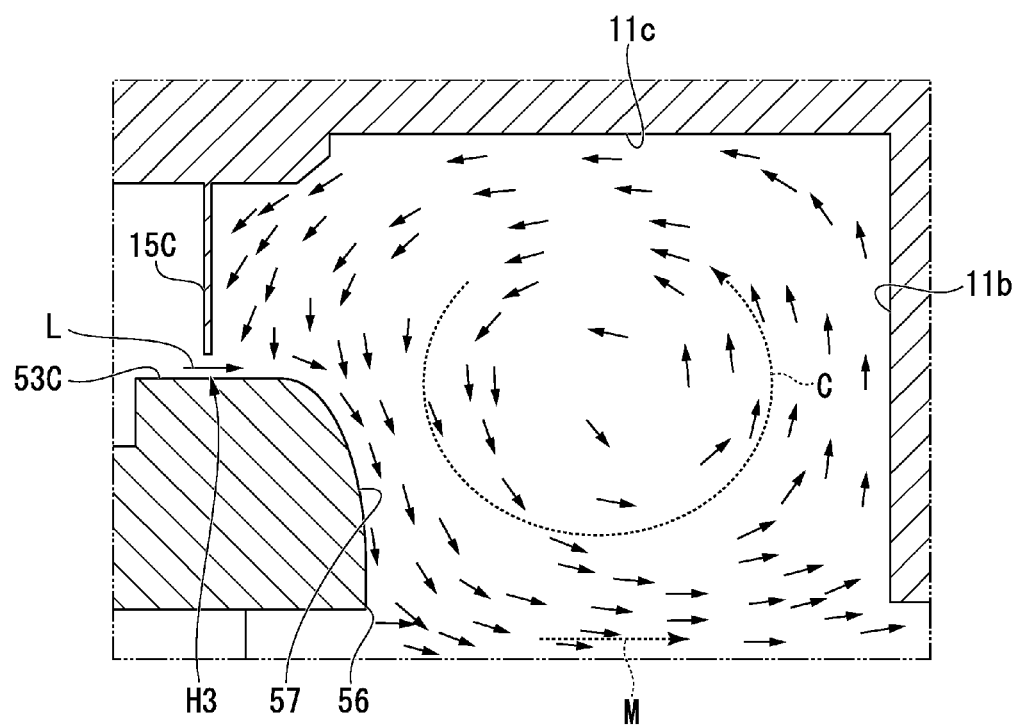
FIG. 19 is an analysis result of a model 2 in which the guide curved surface 57 according to the invention is formed.

FIG. 18 is the simulation result of a model 1 in which the guide curved surface 57 is omitted and FIG. 19 is the simulation result of a model 2 in which the guide curved surface 57 is formed. In addition, in FIGS. 18 and 19, the same constituent elements as those in FIGS. 1 to 17C are denoted by the same signs and a description thereof is omitted here.

Each model is formed such that an axial distance between the trailing edge end portion 56 and the downstream groove side surface 11b is large compared to that in each embodiment described above.

Further, in the comparative model 1 shown in FIG. 18, a configuration is adopted in which the outer peripheral surface 53C and the trailing edge end portion 56 are connected by the end face 057 intersecting the axial direction and an outer peripheral surface 053D intersecting the radial direction.

As shown in FIG. 18, in the model 1 in which the guide curved surface 57 is omitted, the leakage flow L flowing along the outer peripheral surface 53C is separated at the corner portion 057a formed between the outer peripheral surface 53C and the end face 057. Therefore, the reverse vortex X is formed on the downstream side in the axial direction of the end face 057 and also a vortex is formed to be in contact with the reverse vortex X at the downstream side in the axial direction and the radially outward side of the reverse vortex X. Therefore, the reverse vortex X flows back with respect to the main flow M and also whirls the main flow M up at the trailing edge end portion 56, and thus the main flow M is agitated.

On the other hand, in the model 2 shown in FIG. 19, the leakage flow L flowing along the outer peripheral surface 53C is guided to the trailing edge end portion 56 by the guide curved surface 57 and flows out to the main flow M side at the trailing edge end portion 56. Therefore, the reverse vortex X is not formed on the downstream side in the axial direction of the guide curved surface 57 and the large forward vortex C is formed in the gap G. Therefore, agitation does not occur in the main flow M at the boundary between the gap G and the flow path of the main flow.

Figure 20:
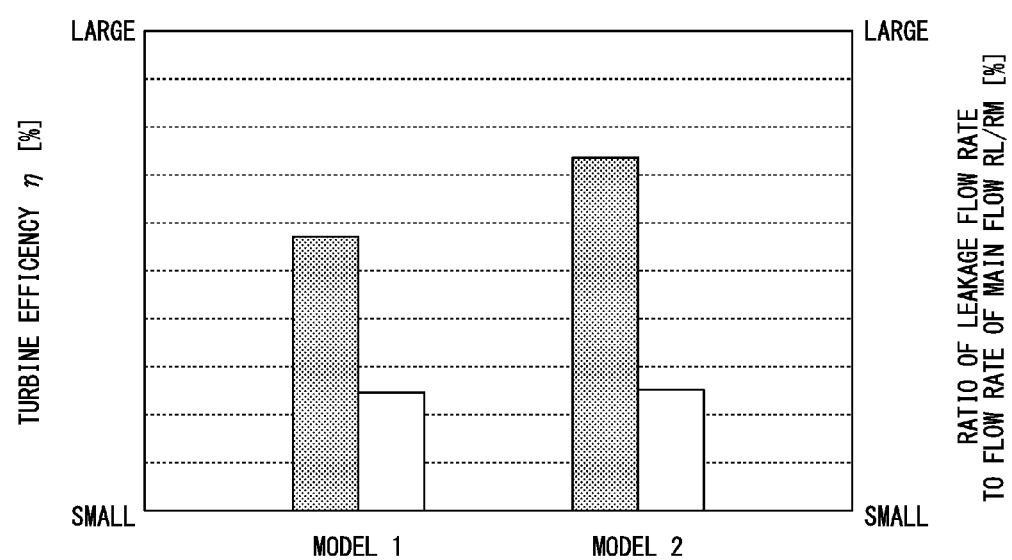
FIG. 20 is a graph showing turbine efficiency and a ratio of leakage flow rate to flow rate of main flow in the models 1 and 2 according to the invention.

FIG. 20 is a graph showing the turbine efficiency and the ratio of the leakage flow rate to the flow rate of the main flow in the models 1 and 2, and two types of bar graphs shown on the left side in the drawing show the model 1 and two types of bar graphs shown on the right side in the drawing show the model 2. The bar graph with a pattern of dots applied thereto, of the two types of bar graphs, shows the turbine efficiency, and the white bar graph shows the ratio of the leakage flow rate to the flow rate of the main flow.

As shown in FIG. 20, the ratio of the leakage flow rate to the flow rate of the main flow does not almost change in the models 1 and 2, while the turbine efficiency is larger in the model 2 than in the model 1. That is, it can be confirmed that the turbine efficiency is better in the model 2 than in the model 1.

In addition, operating procedure or the shapes, the combination, or the like of the respective constituent members shown in the embodiments described above is an example, and various changes can be made based on design requirements or the like within a scope that does not depart from the gist of the present invention.

For example, in each embodiment described above, the divider outer ring 11 is made to be a separate body from the casing 10. However, the divider outer ring 11 may also be formed integrally with the casing 10.

Further, the guide curved surface 57 or 57A in each embodiment described above may also be formed in a concavo-convex shape. By forming the guide curved surface 57 or 57A in this manner, the leakage flow L flowing along the guide curved surface 57 or 57A is turned into turbulent flow and adherability of the leakage flow L to the guide curved surface 57 or 57A is improved, and thus, it becomes difficult for the leakage flow L to be separated from the guide curved surface 57 or 57A. Therefore, the leakage flow L can be more reliably guided to the trailing edge end portion 56 of the tip shroud 51.

In addition, the "concavo-convex shape" described above includes shapes from a size of a visible extent that is obtained by carrying out dimple processing or the like to a minute size of the extent that is not visible.

Further, in each embodiment described above, the cross-sectional contour of the guide curved surface 57 or 57A is formed in an elliptical shape or an arc shape. However, the cross-sectional contour may be formed in, for example, a cross-sectional contour having an inflection point and may also be a contour in which a plurality of arcs having different curvatures or an arc and a straight line are smoothly continuous.

Further, in each embodiment described above, the present invention is applied to the turbine blade 50 of the final stage. However, the present invention can be applied to the turbine blade 50 of an arbitrary stage.

Figure 21:
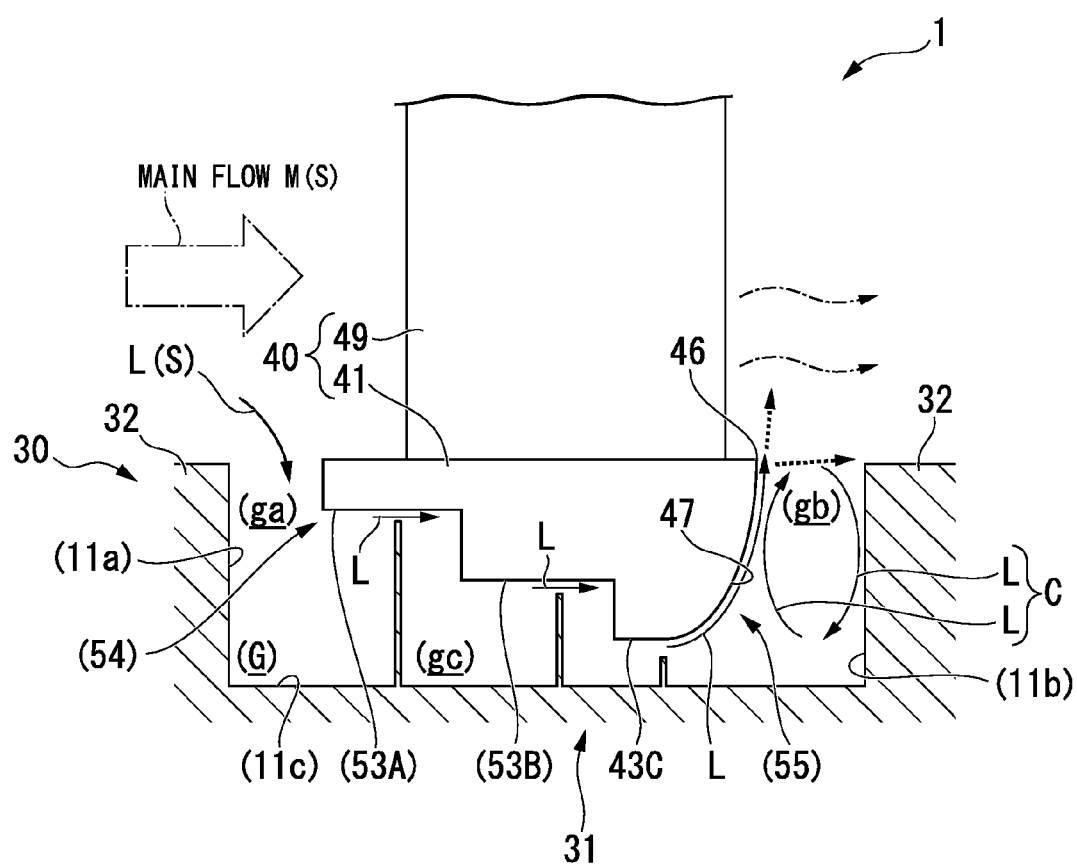
FIG. 21 is a main section enlarged cross-sectional view showing an example in which the invention is applied to a turbine vane 40 and is equivalent to the main section J in FIG. 1.

Further, in each embodiment described above, the present invention is applied to the turbine blade 50. However, as shown in FIG. 21, the present invention may be applied to the turbine vane 40 (in FIG. 21, the same constituent elements as those in FIGS. 1 to 20 are denoted by the same signs and constituent elements that can approximate those in FIGS. 1 to 20 are denoted by the same signs in parentheses). In the case of FIG. 21, the shaft body 30 is a rotor, an accommodating concave body is configured to be the shaft main body 31 and the disks 32 that are adjacent to each other, a guide curved surface 47 is formed between an inner peripheral surface (a peripheral surface) 43C of the hub shroud (the shroud) 41 and a trailing edge end portion 46.

Further, in each embodiment described above, the tip shroud 51 is formed in a step shape. However, the tip shroud 51 may be formed in a flat shape without forming a step.

Further, in each embodiment described above, the three step portions 52 are provided. However, the step portion 52 may be two and may also be four or more. Further, the step portion 52 need not be formed in a staircase pattern and may also be formed in a concavo-convex shape.

Further, the seal fin 15 and the step portion 52 correspond one-to-one as in the above-described embodiments, the seal fin 15 and the step portion 52 need not necessarily correspond one-to-one and the number of these can be arbitrarily designed.

Further, in the above-described embodiments, the present invention is applied to a condensation type steam turbine. However, the present invention can also be applied to other types of steam turbines, for example, turbine types such as a two-stage extraction turbine, an extraction turbine, and a mixed air turbine.

In addition, in the above-described embodiments, the present invention is applied to a steam turbine. However, the present invention can also be applied to a gas turbine.

INDUSTRIAL APPLICABILITY

The present invention relates to a turbine including: a rotor rotatably supported; a stator provided around the rotor; a blade body having a blade provided at one of the rotor and the stator and extending in a radial direction toward the other side from one side and a shroud extending in a circumferential direction at a tip portion in the radial direction of the blade; and an accommodating concave body provided at the other of the rotor and the stator, extending in the circumferential direction, accommodating the shroud with a gap interposed therebetween, and relatively rotating with respect to the blade body, wherein a leakage flow leaked from a main flow flowing along the blade flows to the gap, and the shroud is provided with a guide curved surface formed between a peripheral surface facing the accommodating concave body and a trailing edge end portion formed closer to the main flow side than the peripheral surface in a downstream side of the leakage flow, and a guide curved surface is configured to guide the leakage flow along the peripheral surface from the peripheral surface to the trailing edge end portion. According to the present invention, the generation of the mixing loss can be suppressed, and thus the turbine efficiency can be improved.

REFERENCE SIGNS LIST

1, 1A, 2, 2A, 3, 4: steam turbine (turbine)
10: casing (stator)
11: divider outer ring (accommodating concave body)
30: shaft body (rotor)
31: shaft main body (accommodating concave body)
32: disk (accommodating concave body)
40: turbine vane (blade body)
41: hub shroud (shroud)
43C: inner peripheral surface (peripheral surface)
50: turbine blade (blade body)
51: tip shroud (shroud)
53C: outer peripheral surface (peripheral surface)
46, 56, 70: trailing edge end portion 57, 57A: guide curved surface
81: guide pathway
G: gap
L: leakage flow
M: main flow

The invention claimed is:

1. A turbine comprising:
a rotor that is rotatably supported;
a stator around the rotor;
a blade body having a blade at one of the rotor and the stator and extending in a radial direction toward a first side from a second side and a shroud extending in a circumferential direction at a tip portion in the radial direction of the blade; and
an accommodating concave body at another of the rotor and the stator, extending in the circumferential direction, being configured to accommodate the shroud with a gap interposed there between, and relatively rotate with respect to the blade body;
wherein leakage flow leaked from main flow flowing along the blade is configured to flow into the gap,
wherein the shroud includes a guide curved surface between a peripheral surface facing the accommodating concave body and a trailing edge end portion that is closer to the main flow side than the peripheral surface in a downstream side of the leakage flow,
wherein the guide curved surface has a curved surface that is in a convex shape protruding outward toward the accommodating concave body and away from the blade and is continuously curved from the peripheral surface toward the trailing edge end portion, and
wherein the guide curved surface is configured to guide the leakage flow along the peripheral surface from the peripheral surface to the trailing edge end portion.

2. The turbine according to claim 1, wherein the trailing edge end portion is an axial fin extending in a direction of a rotation axis.

3. The turbine according to claim 1, wherein a guide pathway configured to perform guidance in a direction opposite to a relative rotation direction of the shroud with respect to the accommodating concave body is on the guide curved surface, and
in the guide pathway, an inflow portion configured to allow the leakage flow to flow into the guide pathway at the peripheral surface side and an outflow portion configured to allow the leakage flow to flow out of the guide pathway at the trailing edge end portion side are shifted in the opposite direction to the relative rotation direction.

4. The turbine according to claim 3, wherein the guide pathway is in a groove shape.

5. The turbine according to claim 3, wherein the guide pathway is a protrusion wall protruding in a direction normal to the guide curved surface.

6. The turbine according to claim 1, wherein in the guide curved surface, a cross-sectional contour of a cross section of the guide curved surface along a plane intersecting the circumferential direction is in an arc shape.

7. The turbine according to claim 1, wherein in the guide curved surface, a cross-sectional contour of a cross section of the guide curved surface along a plane intersecting the circumferential direction is in an elliptical shape.

8. The turbine according to claim 1, wherein the guide curved surface is in a more concavo-convex shape compared to at least a surface of the blade.

9. The turbine according to claim 2, wherein a guide pathway configured to perform guidance in a direction opposite to a relative rotation direction of the shroud with respect to the accommodating concave body is on the guide curved surface, and
in the guide pathway, an inflow portion configured to allow the leakage flow to flow into the guide pathway at the peripheral surface side and an outflow portion configured to allow the leakage flow to flow out of the guide pathway at the trailing edge end portion side are shifted in the opposite direction to the relative rotation direction.

10. The turbine according to claim 9, wherein the guide pathway is in a groove shape.

11. The turbine according to claim 9, wherein the guide pathway is a protrusion wall protruding in a direction normal to the guide curved surface.

12. The turbine according to claim 2, wherein in the guide curved surface, a cross-sectional contour of a cross section of the guide curved surface along a plane intersecting the circumferential direction is in an arc shape.

13. The turbine according to claim 3, wherein in the guide curved surface, a cross-sectional contour of a cross section of the guide curved surface along a plane intersecting the circumferential direction is in an arc shape.

14. The turbine according to claim 4, wherein in the guide curved surface, a cross-sectional contour of a cross section of the guide curved surface along a plane intersecting the circumferential direction is in an arc shape.

15. The turbine according to claim 5, wherein in the guide curved surface, a cross-sectional contour of a cross section of the guide curved surface along a plane intersecting the circumferential direction is in an arc shape.

16. The turbine according to claim 9, wherein in the guide curved surface, a cross-sectional contour of a cross section of the guide curved surface along a plane intersecting the circumferential direction is in an arc shape.

17. The turbine according to claim 10, wherein in the guide curved surface, a cross-sectional contour of a cross section of the guide curved surface along a plane intersecting the circumferential direction is in an arc shape.

18. The turbine according to claim 11, wherein in the guide curved surface, a cross-sectional contour of a cross section of the guide curved surface along a plane intersecting the circumferential direction is in an arc shape.

19. The turbine according to claim 2, wherein in the guide curved surface, a cross-sectional contour of a cross section of the guide curved surface along a plane intersecting the circumferential direction is in an elliptical shape.

20. The turbine according to claim 3, wherein in the guide curved surface, a cross-sectional contour of a cross section of the guide curved surface along a plane intersecting the circumferential direction is in an elliptical shape.

* * * * *